(12) United States Patent
Takizawa et al.

(10) Patent No.: US 6,292,730 B1
(45) Date of Patent: Sep. 18, 2001

(54) SPEED RATIO CONTROLLER AND CONTROL METHOD OF CONTINUOUSLY TRANSMISSON

(75) Inventors: Satoshi Takizawa, Yokohama; Masato Koga, Atsugi; Mitsuru Watanabe, Hadano, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/338,434

(22) Filed: Jun. 23, 1999

(30) Foreign Application Priority Data

| Jun. 23, 1998 | (JP) | 10-175694 |
| Jul. 24, 1998 | (JP) | 10-209451 |
| Aug. 7, 1998 | (JP) | 10-224663 |
| Aug. 7, 1998 | (JP) | 10-224665 |

(51) Int. Cl.[7] ................................................ G05D 17/02
(52) U.S. Cl. ........................................... 701/51; 477/68
(58) Field of Search ................................. 701/51, 53, 60, 701/61, 62, 63; 477/15, 20, 68, 110, 115, 159, 174, 906

(56) References Cited

U.S. PATENT DOCUMENTS

| 4,764,156 | * | 8/1988 | Ohkumo | 474/28 |
| 4,819,187 | * | 4/1989 | Yasue et al. | 364/431.01 |
| 4,823,644 | * | 4/1989 | Ohkumo | 74/866 |
| 5,074,392 | * | 12/1991 | Hasegawa et al. | 192/52 |
| 5,287,772 | * | 2/1994 | Aoki et al. | 74/846 |
| 5,682,866 | * | 11/1997 | Shimizu et al. | 123/674 |
| 5,897,056 | * | 4/1999 | Morikawa et al. | 237/12.3 R |
| 6,073,072 | * | 6/2000 | Ishii et al. | 701/63 |

FOREIGN PATENT DOCUMENTS

| 5-294175 | 11/1993 | (JP) . |
| 8-270772 | 10/1996 | (JP) . |

* cited by examiner

Primary Examiner—Tan Nguyen
Assistant Examiner—Dalena Tran
(74) Attorney, Agent, or Firm—Foley & Lardner

(57) ABSTRACT

In a vehicle continuously variable transmission, an engine rotation speed, input rotation speed of the transmission and an output rotation speed of the transmission are respectively detected by sensors (64, 65, 68). Based on the output signals from these rotation speed sensors (64, 65, 68), a controller (61) controls a speed ratio of the transmission within a predetermined speed ratio range. The controller (61) also determines if any of the rotation speed sensors (64, 65, 68) has an abnormality based on the output signals from these sensors (64, 65, 68) and narrows the predetermined speed ratio range (S234) when any of the sensors has been determined to have an abnormality, so as to prevent an extraordinary speed ratio control from being performed.

12 Claims, 20 Drawing Sheets

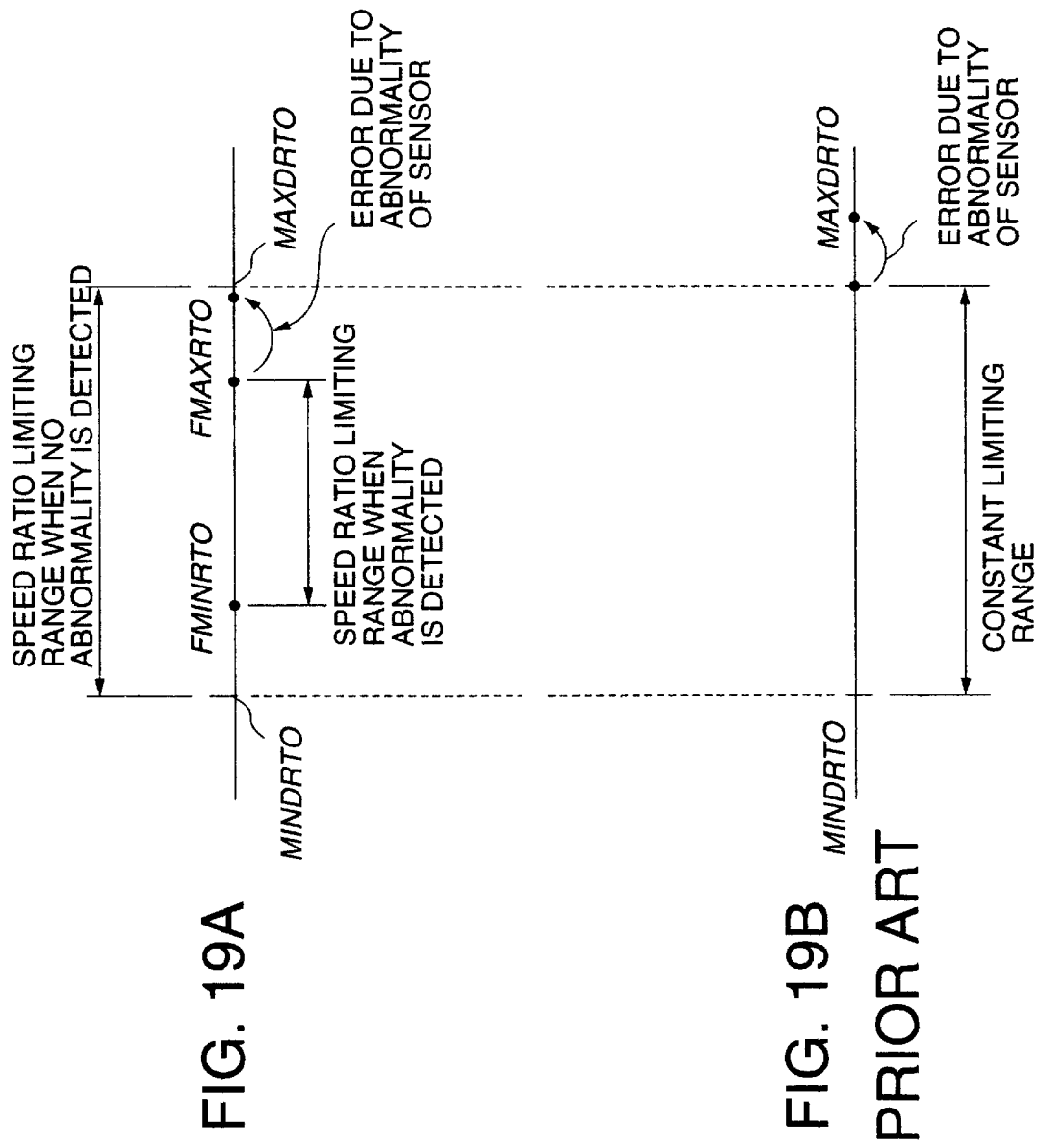

SPEED RATIO CONTROLLER AND CONTROL METHOD OF CONTINUOUSLY TRANSMISSON

FIELD OF THE INVENTION

This invention relates to speed ratio control of a continuously variable transmission of a vehicle.

BACKGROUND OF THE INVENTION

Tokkai Hei 8-270772 published by the Japanese Patent Office in 1996 discloses a speed ratio control device of a toroidal continuously variable transmission which transmits an output torque of an engine to drive wheels of a vehicle at an arbitrary speed ratio. This prior art specifically discloses feedback correction of the speed ratio of the transmission as well as a torque shift error correction. The torque shift error is a speed ratio error due to a deformation of trunnions supporting power rollers of the transmission when the output torque of the engine, or in other words, the input torque of the transmission varies.

SUMMARY OF THE INVENTION

Feedback control of the speed ratio is performed based on a deviation of a real speed ratio from a target speed ratio. Herein, the real speed ratio is obtained by dividing an input rotation speed of the transmission by an output rotation speed. For this purpose, a control device is provided with an input rotation speed sensor and an output rotation speed sensor.

With respect to the torque shift error correction, the engine output torque is estimated from an engine rotation speed and a throttle opening. For this purpose, the control device is provided with an engine rotation speed sensor and a throttle opening sensor.

In both feedback correction and torque shift error correction, when rotation sensors related to the correction do not function correctly, there is a possibility that the control device will output a command signal exceeding a hardware operation limit of the transmission. Such a command signal, however, adversely affects the precision and response time of the speed ratio control.

It is therefore an object of this invention to prevent an extraordinary speed ratio control from being performed when an abnormality is detected in any of the rotation speed sensors.

In order to achieve the above object, this invention provides a speed ratio control device for use with a continuously variable transmission transmitting an output torque of an engine to a drive wheel of a vehicle at an arbitrary speed ratio. The device comprises a sensor for detecting a rotation speed of the engine, a sensor for detecting an input rotation speed of the transmission, a sensor for detecting an output rotation speed of the transmission, and a microprocessor programmed to control the speed ratio of the transmission within a predetermined speed ratio range based on output signals from the sensors, perform a determination if any of the sensors has abnormality based on the output signals from the sensors, and correct the predetermined speed ratio range to be narrower when any of the sensors has been determined to have abnormality.

This invention also provides a speed ratio control method of a continuously variable transmission transmitting an output torque of an engine to a drive wheel of a vehicle at an arbitrary speed ratio. The method comprises detecting a rotation speed of the engine from an output signal from an engine rotation speed sensor, detecting an input rotation speed of the transmission from an output signal from an input rotation speed sensor, detecting an output rotation speed of the transmission from an output signal from an output rotation speed sensor, controlling the speed ratio of the transmission within a predetermined speed ratio range based on the output signals from the sensors, performing a determination if any of the sensors has abnormality based on the output signals from the sensors, and correcting the predetermined speed ratio range to be narrower when any of the sensors has been determined to have abnormality.

The details as well as other features and advantages of this invention are set forth in the remainder of the specification and are shown in the accompanying drawings.

BRIEF DESCRIPTION OF THE DRAWINGS

FIGS. 19A and 19B are diagrams explaining a reduction of a predetermined allowable speed ratio range performed by the controller when an abnormality is found in any of the rotation sensors.

DESCRIPTION OF THE PREFERRED EMBODIMENTS

Figure 1:
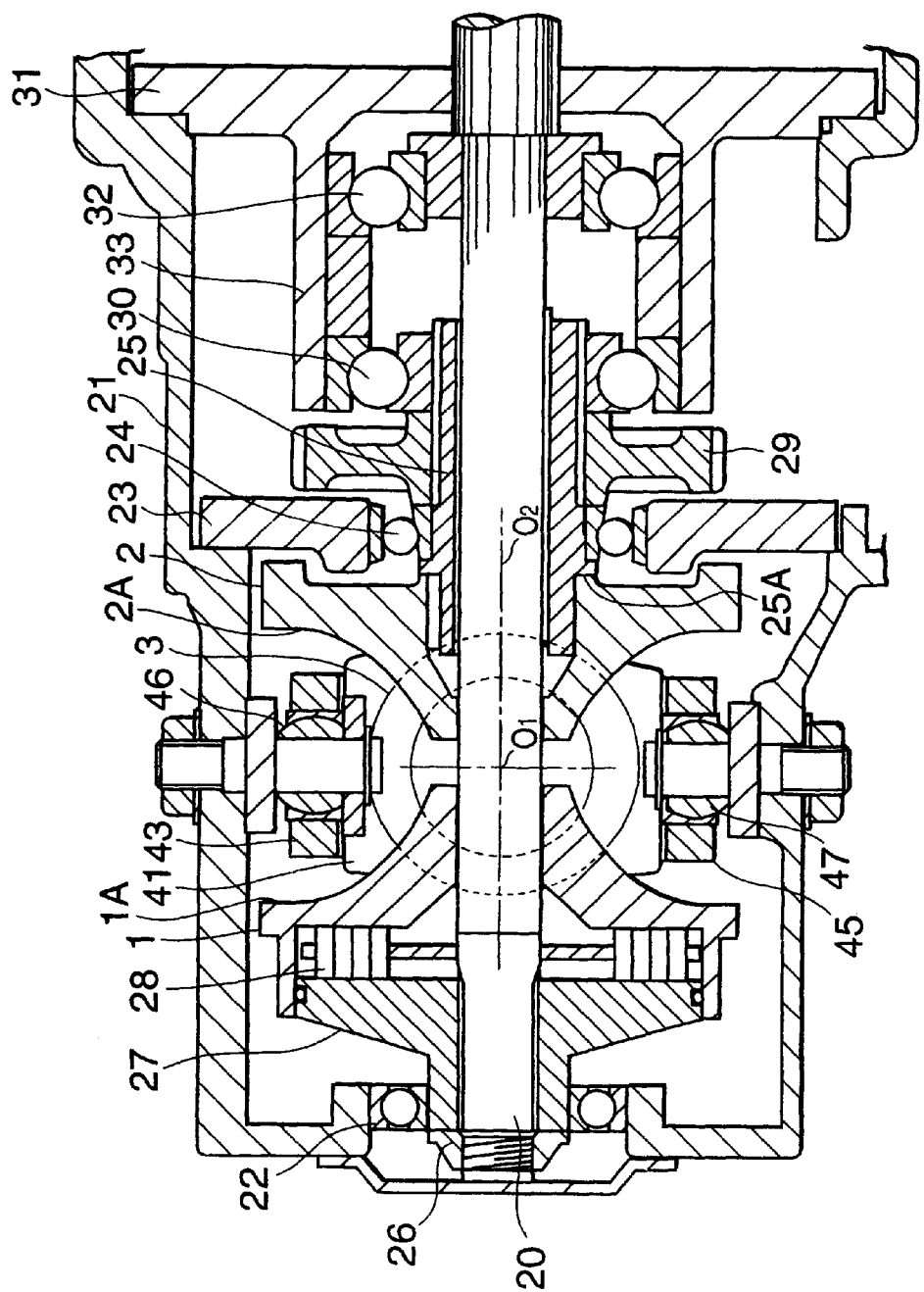
FIG. 1 is a longitudinal sectional view of a toroidal continuously variable transmission to which this invention is applied.

Referring to FIG. 1 of the drawings, a toroidal continuously variable transmission to which this invention is applied comprises an input shaft 20 and an output gear 29.

The input shaft 20 is connected to an engine of a vehicle via a torque converter. The engine and the torque converter are located on the right side of FIG. 1, but not shown. The output gear 29 outputs a rotation torque for driving the vehicle.

A cam flange 27 screws into the tip of the input shaft 20. A nut 26 is tightened to the tip of the input shaft 20 so that the cam flange 27 is fixed to the input shaft 20.

The cam flange 27 is inserted in a cylindrically shaped back side part of an input disk 1. The input shaft 20 passes through the center of the input disk 1 leaving a small clearance. By this arrangement, the input disk 1 is maintained coaxial with the rotation shaft 20. The cam flange 27 is supported in a case 21 via a bearing 22, and the base end of the input shaft 20 is supported by an angular bearing 32.

A cam roller 28 is disposed between the cam flange 27 and the input disk 1. The cam roller 28 comprises a cam surface which presses the input disk 1 to the right of the figure according to the relative rotational displacement of the cam flange 27 and the input disk 1.

An output disk 2 is attached free to rotate relative to the input disk 1 on the outer circumference of the rotation shaft 20.

The input disk 1 and power output disk 2 comprise toroidal curved surfaces 1A, 1B which face each other, and a pair of power rollers 3 is gripped between these curved surfaces 1A, 1B.

The output disk 2 is spline jointed to a sleeve 25 supported on the outer circumference of the rotation shaft 20 via a needle bearing. A large diameter part 25A is formed in the sleeve 25 to support a thrust load which interacts on the power output disk 2 towards the right of FIG. 1.

The sleeve 25 is supported by an intermediate wall 23 of the case 21 via a radial bearing 24, and is also supported by an angular bearing 30. The angular bearing 30 and an angular bearing 32 are engaged inside a cylindrically-shaped cover 31 fixed to the case 21.

A spacer 33 which engages with the inside of the cover 31 is also gripped by the angular bearings 30, 32.

The thrust force exerted by the input disk 1 on the rotation shaft 3 towards the left of the drawing, and the thrust force exerted by the output disk 2 on the sleeve 25, therefore cancel each other out due to the spacers 33 gripped between the angular bearings 30, 32. Also, the load which acts on the angular bearings 30, 32 in the radial direction is supported by the cover 31.

The output gear 29 is spline jointed to the outer circumference of the sleeve 25. The rotation of the output gear 29 is transferred to the outside of the case 21 via a gear unit, not shown.

The power rollers 3 are supported by trunnions 41.

By driving the trunnions 41 in a direction perpendicular to the rotation shaft 20, the contact positions of the power rollers 3 with the input disk 1 and output disk 2 are changed. Due to this change of contact positions, a force is exerted on the power rollers 3 by the disks 1 and 2 so as to rotate the power rollers 3 around the axis $O_3$ which causes the gyration angle of the power rollers 3 to vary. As a result, the distance of the contact point between the power rollers 3 and the input disk 1 from the rotation shaft 20, and the distance of the contact point between the power rollers 3 and the output disk 2 from the rotation shaft 20, vary, and a speed ratio varies accordingly.

Figure 2:
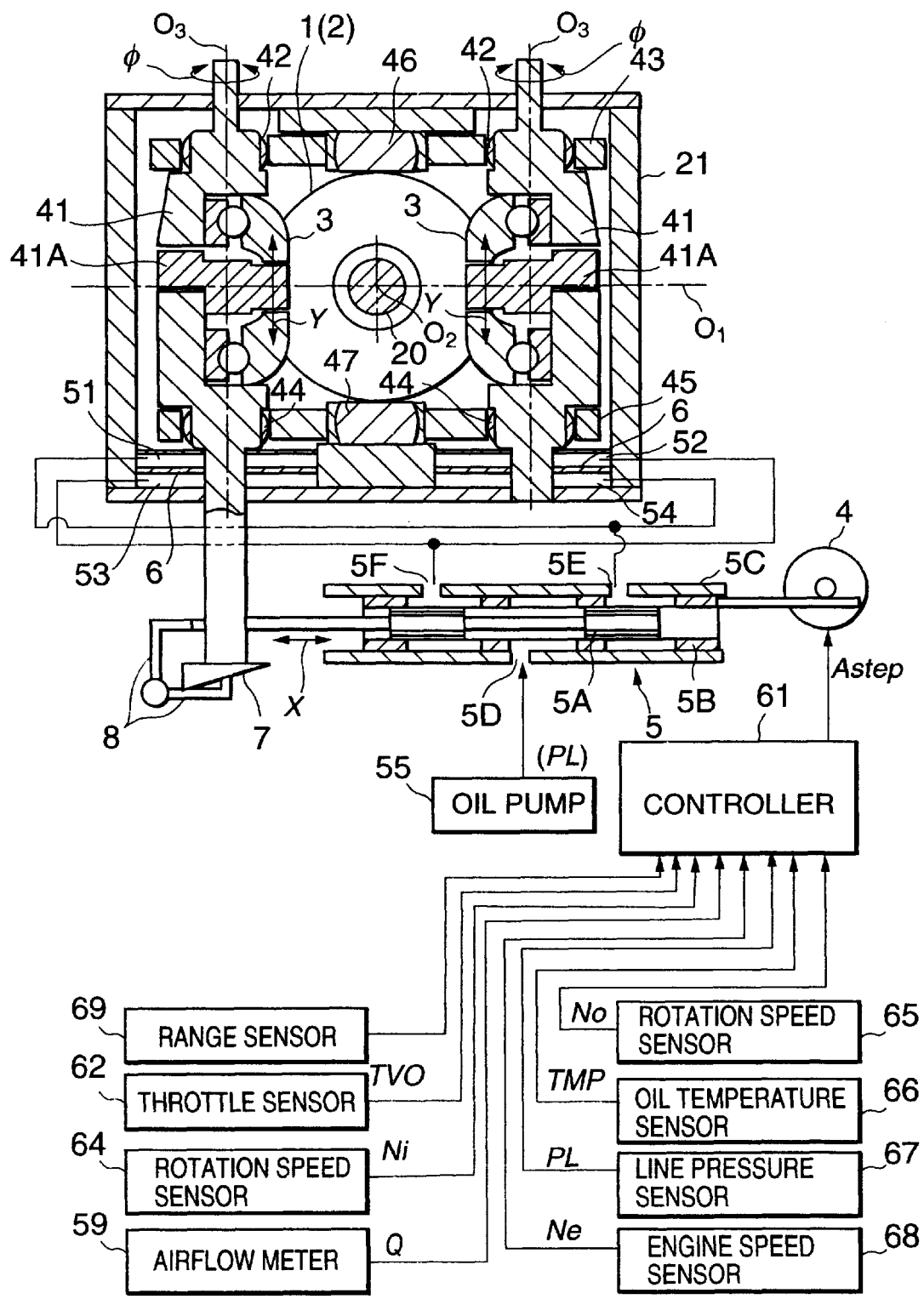
FIG. 2 is a schematic diagram of a speed ratio control device according to this invention.

As shown in FIG. 2, the trunnions 41 support the power rollers 3 such that they are free to rotate about an axis $O_1$ shown in FIG. 2 via a crank-shaped shaft 41A, and such that they are free to swing within a small range around the base end of the shaft 41A.

The upper end of each trunnion 41 is joined to an upper link 43 via a spherical joint 42, and a lower end is joined with a lower link 45 via a spherical joint 44. The upper link 43 and lower link 45 are supported in the case 21 via spherical joints 46 and 47, respectively. Due to these links, the pair of trunnions 41 always displaces in reverse directions and by an equal distance along an axis $O_3$ shown in FIG. 2.

A piston 6 is fixed to each of these trunnions 41. The piston 6 displaces the trunnion 41 along the axis $O_3$ according to an oil pressure balance of oil chambers 51, 53 and oil chambers 52, 54 which are formed in the case 21. Oil pressure Is supplied to these oil chambers 51, 52, 53, and 54 from an oil pressure control valve 5.

The oil pressure control valve 5 comprises an outer sleeve 5C, inner sleeve 5B and a spool 5A which slides on the inside of the inner sleeve 5B. A port 5D which draws the pressure of an oil pump 55, port 5E connected to the oil chambers 51, 54, and port 5F connected to the oil chambers 52, 53 are formed in the outer sleeve 5C, respectively. The inner sleeve 5B is connected with a step motor 4 via a rack and pinion. Also, openings at the ends of the inner sleeve 5B are connected to drain passages, not shown.

The spool 5A is joined to a link 8. The link 8 displaces the spool 5A according to a rotational displacement around the axis $O_3$ and a displacement along the axis $O_3$ of a precess cam 7 fixed to the lower end of one of the trunnions 41, and mechanically feeds back the gyration angle of the power roller 3 to the oil pressure control valve 5.

The oil pressure control valve 5 changes the pressure supplied to the ports 5E, 5F according to a command signal Astep input to the step motor 4 from the controller 61.

For example, when the spool 5A, outer sleeve SB and inner sleeve 5C are in the positions shown in FIG. 2, the oil chambers 52, 53 receive high pressure oil of an pressure pump 55 from the port 5F, and oil in the oil chambers 51, 54 is drained via the port 5E.

As a result, the trunnion 41 on the left of the figure moves upwards along the axis $O_3$, and the trunnion 41 on the right of the figure moves downwards along the axis $O_3$. Hence, the rotation axis $O_1$ of the power roller 3 displaces from a neutral position at which it intersects a rotation axis $O_2$ of the input disk 1 and the output disk 2, i.e., the center of the rotation shaft 20, in the direction shown by the arrow Y in the drawing.

Due to this displacement, the input disk 1 and output disk 2 cause the power roller 3 together with the trunnions 41 to perform a rotational displacement around the axis $O_3$ and thereby continuously vary the speed ratio.

At this time, the precess cam 7 fixed to the lower end of one trunnion 41 feeds back the displacement amount in the direction of the axis $O_3$ of the trunnion 41 and the rotational displacement of the power roller 3 around the axis $O_3$, to the oil pressure control valve 5 via a link 8, and the spool 5A is displaced in the direction shown by the arrow X in the drawing.

When a speed ratio corresponding to the above-mentioned command signal Astep is attained by this feedback operation, the positional relationship of the spool 5A and inner sleeve 5B is restored to the neutral position wherein inflow and outflow of oil to and from all the oil chambers is stopped.

Hence, the trunnions 41 are maintained in a state where they are displaced in the direction of the axis $O_3$.

On the other hand, the power roller 3 which performed a rotational displacement around the $O_3$ axis pivots on the base end of the shaft 41A while maintaining the new gyration angle, and returns to the neutral position at which the axis $O_1$ and the axis $O_2$ intersect.

The reason why the precess cam 7 feeds back not only the rotational displacement around the axis $O_3$ of the power roller 3, i.e., the gyration angle, but also the axial displacement of the trunnion 41, is that the feedback of the axial displacement of the trunnion 41 works as a damping element which prevents the speed ratio control from oscillating. The command signal Astep is determined by the controller 61.

The controller 61 comprises a microprocessor comprising a central processing unit (CPU), random access memory (RAM), read-only memory (ROM) and input/output interface (I/O interface).

Signals are input to the controller 61 from an airflow meter 59 which detects an intake air flowrate Q of the engine, a throttle sensor 62 which detects a throttle opening TVO of the engine, a rotation speed sensor 64 which detects an input rotation speed Ni of the transmission, i.e., the rotation speed of the input disk 1, a rotation speed sensor 65 which detects an output rotation speed No of the transmission, i.e., the rotation speed of the output disk 2, an oil temperature sensor 66 which detects a temperature TMP of the above-mentioned oil pressure fluid, line pressure sensor 67 which detects a line pressure PL, i.e., the oil pressure which the port 5D supplies from the oil pressure pump 55, engine rotation speed sensor 68 which detects a rotation speed Ne of the engine, and a range sensor 69 which detects an operating mode of the transmission chosen by a selector lever, not shown.

The selector lever is a control unit attached to the continuously variable transmission to allow the driver to choose the operating mode of the continuously variable transmission, one range being chosen from plural candidates including a forward travel range, forward sport travel range, reverse range, neutral range, and parking range.

The output rotation speed No of the transmission is also used as a vehicle speed VSP by multiplying No by a constant, because there is a fixed relation between the output rotation speed No and the vehicle speed VSP.

Figure 3A:
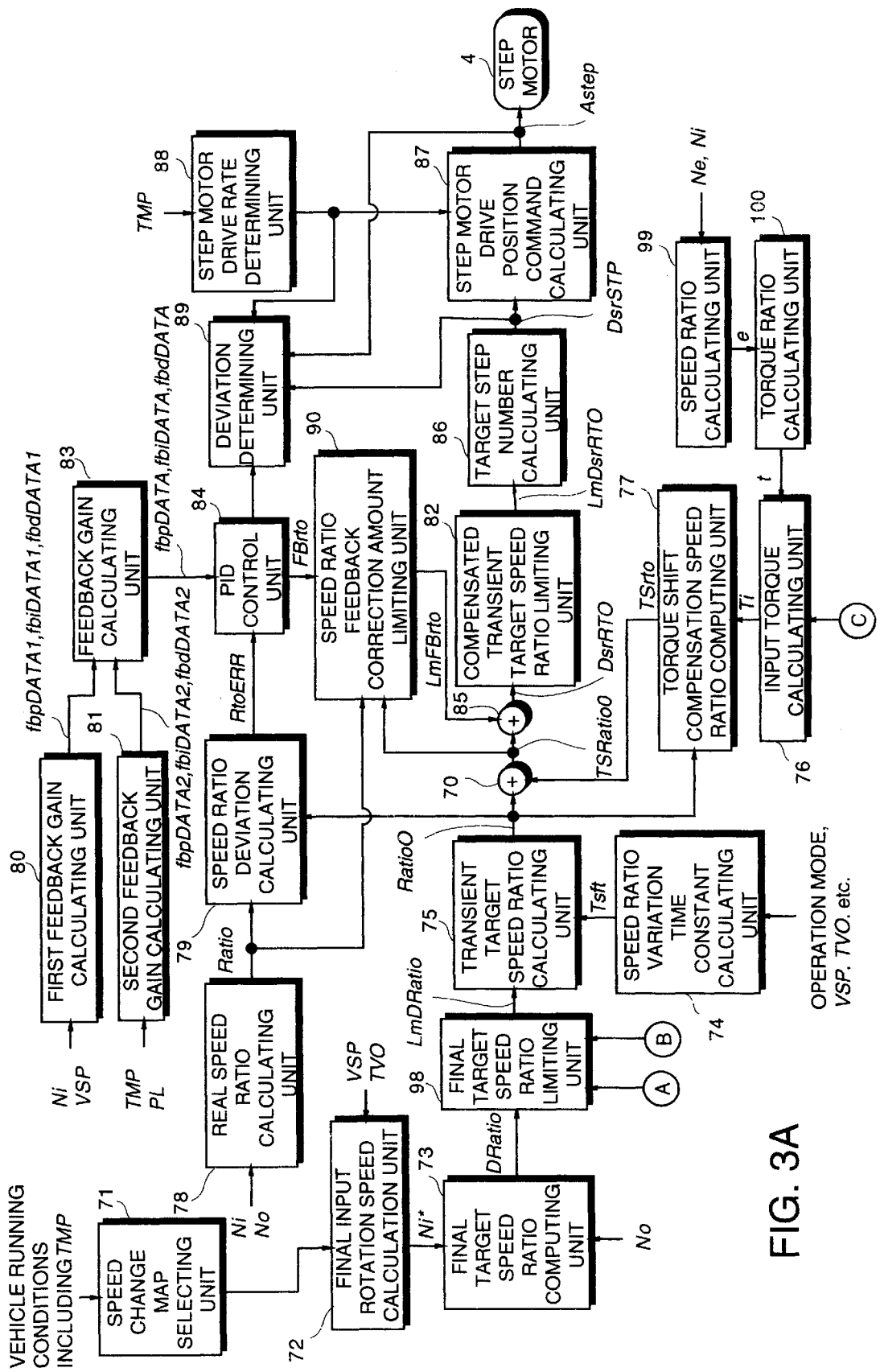
FIGS. 3A and 3B is a block diagram for describing the structure of a controller according to this invention.
Figure 3B:
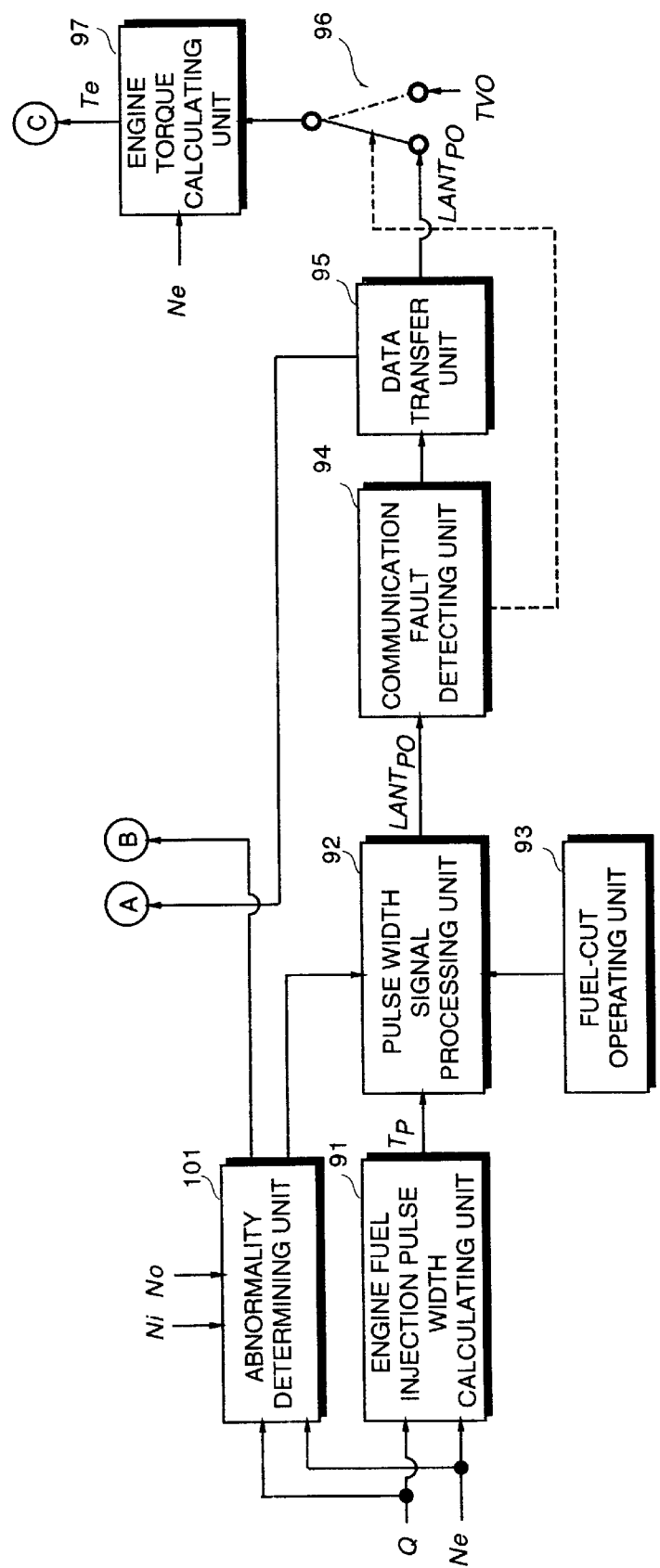

The controller 61 outputs the command signal Astep computed based on the above-mentioned signals to the motor 4, For this purpose, the controller 61 comprises processing units shown in FIGS. 3A and 3B. These units are virtual units constructed from the functions of the above-mentioned CPU, ROM and RAM.

Figure 14:
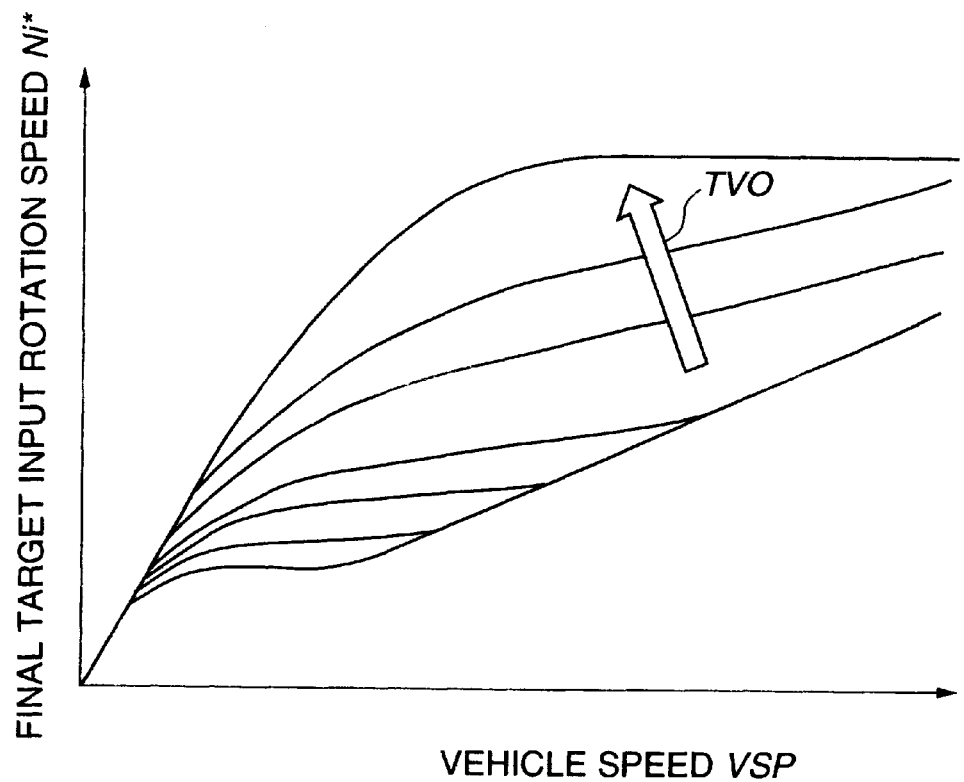
FIG. 14 is a diagram describing a speed change pattern of the toroidal continuously variable transmission.

Referring to FIGS. 3A and 3B, a speed change map selecting unit 71 selects a speed change map to use based on an oil temperature TMP detected by the oil temperature sensor 66, and other vehicle running conditions including the activity of the engine exhaust purification catalyst. In this speed change map, a final input rotation speed Ni* which is a final target rotation speed of the input disk 1, is defined according to the vehicle speed VSP and the throttle opening TVO, as shown in FIG. 14. Plural maps of this kind are stored beforehand in the controller 61 with respect to various running conditions.

A final input rotation speed calculation unit 72 selects a map from the stored maps based on the vehicle running conditions, and obtains the final input rotation speed by referring to this map based on the vehicle speed VSP and throttle opening TVO.

A final target speed ratio computing unit 73 divides the final input rotation speed Ni* by the output rotation speed No of the transmission detected by the rotation speed sensor 65, and calculates a final target speed ratio DRatio.

An engine fuel injection pulse width calculating unit 91 calculates an engine output torque Q/Ne from the engine rotation speed Ne detected by the engine speed sensor 68 and the engine intake air flowrate Q, and obtains a basic pulse width $T_{PO}$ by multiplying the engine output torque Q/Ne by a constant K. The engine fuel injection pulse width calculating unit 91 applies a correction to the basic pulse width $T_{PO}$ with respect to a response delay of an engine intake system and determines the fuel injection pulse width $T_P$ which corresponds to the engine intake air amount. A signal indicative of the fuel injection pulse width $T_P$ is then input to a pulse width signal processing unit 92.

An abnormality determining unit 101 determines if there is an abnormality in any of the input rotation speed sensor 64, output rotation speed sensor 65, engine speed sensor 68 and airflow meter 59 based on the signals input from these sensors and outputs a determination result signal to the pulse width signal processing unit 92 and a final target speed ratio limiting unit 98.

A fuel-cut operating unit 93 controls a fuel-cut operation of the engine and outputs a signal indicative of the number of cylinders wherein fuel-cut is being performed, to the pulse width signal processing unit 92.

On receiving the above signals, the pulse width signal processing unit 92 determines a pulse width signal $LANT_{PO}$ in the following manner. The pulse width signal processing unit 92 sets the signal $LANT_{PO}$ to a value OFFH when the signal input from the abnormality determining unit 101 denotes that there is an abnormality in either of the sensors 68, 59. When the signal denotes no abnormality in the sensors, the pulse width signal processing unit 92 sets the signal $LANT_{PO}$ according to the fuel injection pulse width $T_P$ and the number of cylinders wherein fuel-cut is being performed. Specifically, when all of the cylinders are in fuel-cut operation, the signal $LANT_{PO}$ is set to be 0. When a half of the cylinders are in fuel-cut operation, the signal $LANT_{PO}$ is set equal to $T_P/2$. When none of the cylinders are in fuel-cut operation, the signal $LANT_{PO}$ is set equal to $T_P$. The pulse width signal $LANT_{PO}$ set in this way is output to a communication fault detecting unit 94.

The communication fault detecting unit 94 determines if there is a fault in the communication between the pulse width signal processing unit 92 and communication fault detecting unit 94, based on the pulse width signal $LANT_{PO}$.

When there is no fault, the communication fault detecting unit 94 transfers the input signal $LANT_{PO}$ a data transfer unit 95. When the communication is found to be faulty, the communication fault detecting unit 94 outputs a change-over signal to a signal switching unit 96 so as to change over a signal line shown by a solid line in FIG. 3B to another signal line shown by a dotted line in the figure.

The data transfer unit 95 transfers the input signal $LANT_{PO}$ to the signal switch 96 and to the final target speed ratio limiting unit 98.

The signal switching unit 96 selectively input the throttle opening TVO detected by the throttle sensor 62 and pulse width signal $LANT_{PO}$ transferred from the data transfer unit 95 to an engine torque calculating unit 97 according to the change-over signal from the communication fault detecting unit 94.

The engine torque calculating unit 97 calculates an engine output torque Te based on the input signal from the signal switching unit 96 and the engine rotation speed Ne detected by the engine speed sensor 68, by referring to a map previously stored in the controller 61.

The final target speed ratio limiting unit 98 determines if there is an abnormality in the rotation speed sensors 64, 65, 68 or in the communication between the pulse width signal processing unit 92 and communication fault detecting unit 94 based on the signals input from the abnormality determining unit 101 and data transfer unit 95. When an abnormality is found, the final target speed ratio limiting unit 98 applies a limitation to the final target speed ratio DRatio input from the final target speed ratio computing unit 73. This limitation is defined by limiting values FMAXRTO and FMINRTO for abnormal conditions. When no abnormality is found, the final target speed ratio limiting unit 98 limits the final target speed ratio DRatio within a range defined by other limiting values MAXDRTO and MINDRTO for normal conditions. Herein, the range defined by the limiting values FMAXRTO and FMINRTO is narrower than the range defined by the limiting values MAXDRTO and MINDRTO as shown in FIGS. 19A and 19B. The reason for applying different limiting values will be described later.

The limited value is output to a transient target speed ratio calculating unit 75 as a limited final target speed ratio LmDRatio.

When there is no abnormality and the final target speed ratio DRatio is within the range defined by the limiting values MAXDRTO and MINDRTO for normal conditions, the final target speed ratio limiting unit 98 outputs the final target speed ratio DRatio without modification as the limited final target speed ratio LmDRatio to the transient target speed ratio calculating unit 75.

A speed ratio variation time constant calculating unit 74 determines a time constant Tsft of a speed ratio variation based on the operating mode of the transmission detected by the range sensor 69, vehicle speed VSP, throttle opening TVO, and deviation between a real speed ratio and a transient target speed ratio which will be described later.

The time constant Tsft is a constant specifying the rate of speed ratio variation until the final target speed ratio DRatio is attained, but as the time constant Tsft is varied dynamically in this embodiment as mentioned above, it is actually treated as a variable.

The transient target speed ratio calculating unit 75 calculates a transient target speed ratio RatioO as a target value for every control cycle from the final target speed ratio DRatio and time constant Tsft.

A speed ratio calculating unit 99 calculates a speed ratio e which is a ratio of an input rotation speed and output rotation speed of the torque converter interposed between the engine and transmission. The former is equal to the engine rotation speed Ne and the latter is equal to the input rotation speed Ni of the transmission.

A torque ratio calculating unit 100 calculates a torque ratio t of the torque converter based on the speed ratio e by referring to a torque converter performance map previously stored in the controller 61.

An input torque calculating unit 76 calculates an input torque Ti of the transmission by multiplying the engine torque Te which the engine torque calculating unit 97 has obtained by the torque ratio t.

A torque shift error correction value calculating unit 77 calculates a torque shift error correction value TSrto for correcting a torque shift error peculiar to a toroidal continuously variable transmission. The torque shift error correction value TSrto is calculated from the aforesaid transient target speed ratio RatioO and the transmission input torque Ti.

The reason why this torque shift error occurs will now be described.

When the toroidal continuously variable transmission is operating, the input disk 1 and output disk 2 grip the power rollers 3. This grip pressure acts as force tending to keep the power rollers 3 away from the axis $O_1$, and deforms the trunnions 41 which support the power rollers 3. The deformation of the trunnions 41 introduces an error into the feedback operation of the precess cam 7, and produces a discrepancy between the command signal Astep input into the step motor 4 and the actual speed ratio realized by the command signal. Specifically, the real speed ratio tends to be larger than the target speed ratio when the input torque is increasing, and tends to be smaller than target speed ratio when the input torque is decreasing. This error is known as the torque shift error.

The magnitude of the torque shift error therefore varies according to the transient target speed ratio RatioO and transmission input torque Ti. The torque shift correction value calculating unit 77 therefore calculates the torque shift error correction value TSrto from the transient target speed ratio RatioO and transmission input torque Ti by looking up a map stored beforehand in the controller 61. The torque shift error correction value TSrto is input into an adder 70 together with the transient target speed ratio RatioO.

The adder 70 adds the torque shift error correction value TSrto to the transient target speed ratio RatioO to calculate an error corrected transient target speed ratio TSRatioO. This error corrected transient target speed ratio TSRatioO is equivalent to the target value of a feedforward control of speed ratio.

The controller 61 also adds a feedback correction to this error corrected transient target speed ratio TSRatioO to calculate the command signal Astep.

To make the real speed ratio follow the transient target speed ratio RatioO, the speed ratio feedback control performed by the controller 61 adds a correction to the signal output to the step motor 4. The correction is performed by software. The feedback control performed by the abovementioned precess cam 7 is control performed with hardware so that the speed ratio of the continuously variable transmission coincides with the command signal Astep, and is therefore different from the feedback control performed by the controller 61.

Now, a real speed ratio calculating unit 78 computes the real speed ratio Ratio of the transmission by dividing the input rotation speed Ni by the output rotation speed No. A speed ratio deviation calculating unit 79 subtracts the real speed ratio Ratio from the transient target speed ratio RatioO to calculate the speed ratio deviation RtoERR.

Based on the speed ratio deviation RtoERR, a first feedback gain calculating unit 80 sets a first feedback gain for feedback controlling the speed ratio on the basis of a proportional integral differential (PID) control known in the art.

The parameters set here are a first proportional control feedback gain fbpDATA1, first integral control feedback gain fbiDATA1 and first differential control feedback gain fbdDATA1 which are set based on the transmission input rotation speed Ni and the vehicle speed VSP, respectively.

To set these first feedback gains, a two-dimensional map of each first feedback gain with the input rotation speed Ni and vehicle speed VSP as parameters is stored beforehand in the controller 61, and the first feedback gain computing unit 80 calculates these first feedback gains by looking up each map based on the input rotation speed Ni and the vehicle speed VSP.

The second feedback gain calculating unit 81 sets a second feedback gain based on the transmission oil temperature TMP and the line pressure PL. The parameters set here are a second proportional control feedback gain fbpDATA2, second integral control feedback gain fbiDATA2 and second differential control feedback gain fbdDATA2. These second feedback gains are also found by looking up maps stored beforehand in the controller 61.

A feedback gain calculating unit 83 then calculates the proportional control feedback gain fbpDATA, the integral control feedback gain fbiDATA and the differential control feedback gain fbdDA TA by multiplying the first feedback gains by corresponding second feedback gains.

A PID control unit 84 calculates a speed ratio feedback correction amount FBrto using the speed ratio deviation RtoERR and these feedback gains. For this purpose, a speed ratio feedback correction amount due to proportional control is found by multiplying the speed ratio deviation RtoERR by the gain fbpDATA, a speed ratio feedback correction amount due to integral control is found by multiplying the speed ratio deviation RtoERR by the gain fbiDATA, and a speed ratio feedback correction amount due to proportional control is found by multiplying the speed ratio deviation RtoERR by the gain fbdDATA. These are then substituted into the following PID control equation known in the art to calculate the speed ratio feedback correction amount FBrto.

$$FBrto = RtoERR \cdot fbDATA + \left(\int RtoERR\right) \cdot fbiDATA + \left(\frac{d}{dt} RtoERR\right) \cdot fbdDATA$$

A speed ratio feedback correction amount limiting unit 90 calculates a controllable maximum speed ratio Lmrtomax and controllable minimum speed ratio Lmrtomin from a speed ratio command upper limiting value LIMRTOMAX and speed ratio command lower limiting value LIMRTOMIN defined beforehand, a limited speed ratio command value LmDsrRTO calculated by a compensated transient target speed ratio limiting unit 82 described later, and the real speed ratio Ratio.

The speed ratio control by the controller 61 is repeatedly performed, for example, at an interval of 10 milliseconds.

The above-mentioned limited speed ratio command value LmDsrRTO is the limited speed ratio command value LmDsrRTO which the compensated transient target speed ratio limiting unit 82 calculated on the immediately preceding occasion the process was executed.

The speed ratio feedback correction amount limiting unit 90 then deducts the aforesaid error corrected transient target speed ratio TSRatioO from the controllable maximum/minimum speed ratios Lmrtomax and Lmrtomin, respectively, and calculates a limiting value FbRTOLIMP during increase correction and a limiting value FbRTOLIMM during decrease correction. Further, the speed ratio feedback correction amount FBrto calculated by the PID control unit 84 is limited by these limiting values, and is output as a limited speed ratio feedback correction amount LmFBrto.

The adder 85 adds this limited speed ratio feedback correction amount LmFBrto to the error corrected transient target speed ratio TSRaioO by the following equation to calculate a feedback corrected transient target speed ratio DsrRTO.

$$DsrRTO = TSRatioO + LmFBrto$$

The transient target speed ratio limiting unit 82 computes a limited speed ratio command LmDsrRTO by limiting the feedback corrected transient target speed ratio DsrRTO obtained in this way to a range specified by the above-mentioned speed ratio command upper limiting value LIMRTOMAX and speed ratio command lower limiting value LIMRTOMIN.

A target step number calculating unit 86 calculates a target number of steps DsrSTP of the step motor 4 corresponding to the limited speed ratio command LmDsrRTO by looking up a map stored beforehand in the controller 61.

On the other hand, a step motor drive rate determining unit 88 determines a physical operating limit rate of the step motor 4 based on the oil temperature TMP of the transmission.

A step motor drive position command computing unit 87 determines whether or not the step motor 4 can attain a target numbers of steps DsrSTP in the aforesaid speed ratio control cycle based on this physical operating limit rate. A value obtained by correcting the target step number DsrSTP based on the physical operating limit rate is set as the command signal Astep.

Further, the deviation determining unit 89 calculates a difference ASTP between the target step number DsrSTP and speed change command signal Astep. The processing performed by the deviation determining unit 89 is performed after the target step number calculating unit 86 and the step motor drive position command calculating unit 87 have respectively output the target step number DsrSTP and the command signal Astep. The result is used on the next occasion the process is executed.

The deviation determining unit 89 sets a limiting deviation ΔSTPLIM which can be corrected within a period from the present occasion when the process is executed to the next occasion when the process is executed by the step motor 4, i.e., within one control cycle, based on the aforesaid physical operating limit rate calculated by the step motor drive rate determining unit 88.

If the deviation ΔSTP on the present occasion when the process is executed is equal to or less than the limiting deviation ΔSTPLIM, it is determined that the deviation ΔSTP can be corrected until the next occasion when the process is executed. In this case, a limit is not imposed on the calculation of the above-mentioned speed ratio feedback correction amount FBrto performed by the PID control unit 84 on the next occasion the process is executed.

However, if the deviation ΔSTP on the present occasion when the process is executed exceeds the limiting deviation ΔSTPLIM, it is determined that the deviation ΔSTP cannot be corrected by the time the process is executed on the next occasion. In this case, the PID control unit 84 is commanded so that the PID control unit 84 retains the integral control part, i.e., ∫RtoERR·fbiDATA, to the value on the present occasion the process is executed in the calculation of the aforesaid speed ratio feedback correction amount FBrto.

Here, the difference between the limitation added by the step motor drive position command calculating unit 87 to the target step number DsrSTP, and the limitation added by the deviation determining unit 89 to the speed ratio feedback correction amount FBrto calculated by the PID control unit 84, will be described.

The step motor drive position command calculating unit 87 limits the target step number DsrSTP to a range which can be realized physically in practice, so the step motor 4 always follows the command signal Astep, which is the target step number after limitation.

However, when a deviation arises between the target step number DsrSTP and command signal Astep, on the next occasion the process is executed, the integral correction amount of the speed ratio feedback correction performed by the PID control unit 84 will increase. If this state continues, the feedback correction amount continues to increase, and the tendency to increase will not be eliminated until the transient target speed ratio falls below the upper limiting value or rises above the lower limiting value. Due to this limitation performed by the step motor drive position command calculating unit 87, the state where the feedback correction amount is effectively not reflected in speed ratio control continues, and if the correction amount continues to increase, it will cause subsequent overshoot of the speed ratio or delay in convergence to the transient target speed ratio.

Therefore, if the deviation determining unit 89 determines that the deviation ΔSTP between the target step number DsrSTP and the command signal Astep is larger than the limiting deviation ΔSTPLIM, the integral correction amount is retained to the value at the time the determination is made in the calculation of the speed ratio feedback correction amount performed by the PID control unit 84. If increase of the integral correction amount is suppressed, even if the state where the target step number DsrSTP differs from the command signal Astep continues, the feedback correction amount will not continue to increase, and overshoot of the speed ratio and delay of convergence to the transient target speed ratio can be prevented.

The above functions of the controller 61 are realized by execution of the routines shown in FIGS. 4–13.

Figure 4:
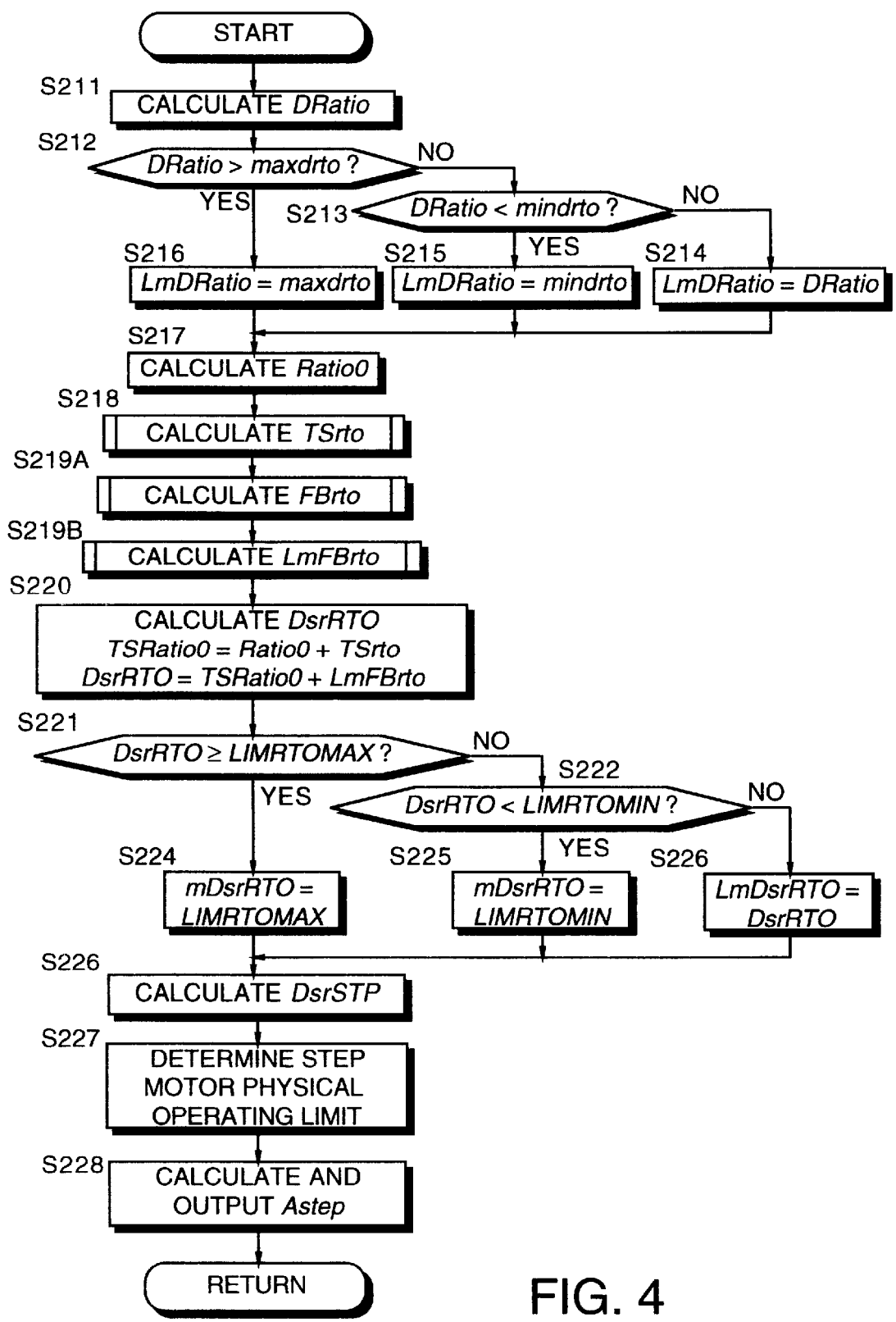
FIG. 4 is a flowchart describing a main routine of a speed ratio control performed by the controller.

FIG. 4 shows the flow of a main routine, and the other figures show the flow of subroutines. All routines are performed at an interval of, for example, 10 milliseconds.

In the main routine of FIG. 4, first in a step S211, the final target speed ratio DRatio is calculated. This step corresponds to the function of speed change map selecting unit 71, final input rotation speed calculation unit 72 and final target speed ratio computing unit 73 in FIG. 3A.

In the following steps S212–S216 corresponds to the function to the final target speed ratio limiting unit 98.

In the step S212 and in a step S213, the final target ratio DRatio is compared with final target speed ratio limiting values maxdrto and mindrto. When the final target ratio DRatio is within a range defined by these limiting values, the limited final target speed ratio LmDRatio is set equal to the final target speed ratio DRatio in a step S214. When the final target speed ratio DRatio is smaller than the lower limiting value mindrto, the limited final target speed ratio LmDRatio is set equal to mindrto in a step S215. When the final target ratio DRatio is greater than the upper limiting value maxdrto, the limited final target speed ratio LmDRatio is set equal to maxdrto in the step S216.

In other words, the limited final target speed ratio LmDRatio is determined by limiting the final target ratio DRatio by the upper and lower limiting values maxdrto and mindrto.

Figure 5:
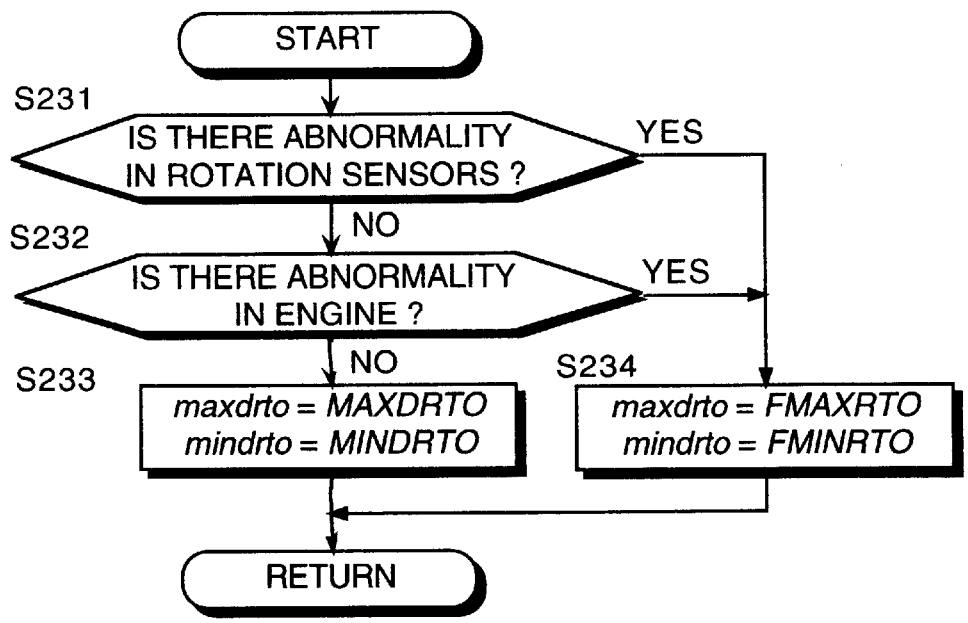
FIG. 5 is a flowchart describing a subroutine for calculating final target speed ratio limiting values maxdrto and mindrto performed by the controller.

The upper and lower limiting values maxdrto and mindrto are determined by a subroutine shown in FIG. 5.

First, in a step S231 it is determined if there is an abnormality in any of the engine rotation speed sensor 68, input rotation speed sensor 64 and output rotation speed sensor 65. The determination is performed by a subroutine shown in FIGS. 18A and 18B which will be described later.

When an abnormality is found in any of these rotation sensors, the subroutine proceeds to a step S234.

When no abnormality is found in the rotation sensors, the subroutine determines if there is an abnormality in the airflow meter 59 in a step S232.

When there is abnormality in the airflow meter 59, the subroutine proceeds to the step S234. In the step S234, the upper limiting value maxdrto is set equal to the upper limiting value FMAXRTO for abnormal conditions, and the lower limiting value mindrto is set equal to the lower limiting value FMINRTO for abnormal conditions.

When no abnormality is found in the airflow meter 59 in a step S232, the subroutine proceeds to a step S233. Herein, the upper limiting value maxdrto Is set equal to the upper limiting value MAXDRTO for normal conditions, and the lower limiting value mindrto is set equal to the lower limiting value MINDRTO for normal conditions.

As described earlier, the range defined by the limiting values FMAXRTO and FMINRTO is narrower than the range defined by the limiting values MAXDRTO and MINDRTO. The reason for applying different limiting values will now be described.

When there is an abnormality in the sensors, the engine torque Te calculated by the engine torque calculating unit 97 is not accurate, and the torque shift error correction value TSrto calculated based on the engine torque Te is also not accurate. In this case, it is almost impossible to perform a substantial torque shift error correction. Allowance corresponding to the torque shift error is therefore introduced to the calculation of the final target speed ratio by setting the limiting range narrower.

In the aforesaid prior art Tokkai Hei 8-270772 wherein the final target speed ratio limiting values maxdrto and mindrto, are always kept constant, a speed ratio command value exceeding the upper limiting value MAXDRTO for normal conditions may be output as shown in FIG. 19B when there is an abnormality in a sensor. When such a situation occurs, the real speed ratio may oscillate due to the feedback control or need a long time until it is settled to a correct value.

In this speed ratio control device, however, by narrowing the limiting range of the final target speed ratio DRatio as shown in FIG. 19A when an abnormality is found in any of the rotation speed sensors, the deviation of the real speed ratio from the range defined by the upper limiting value MAXDRTO and lower limiting value MINDRTO for normal conditions is prevented.

Figure 6:
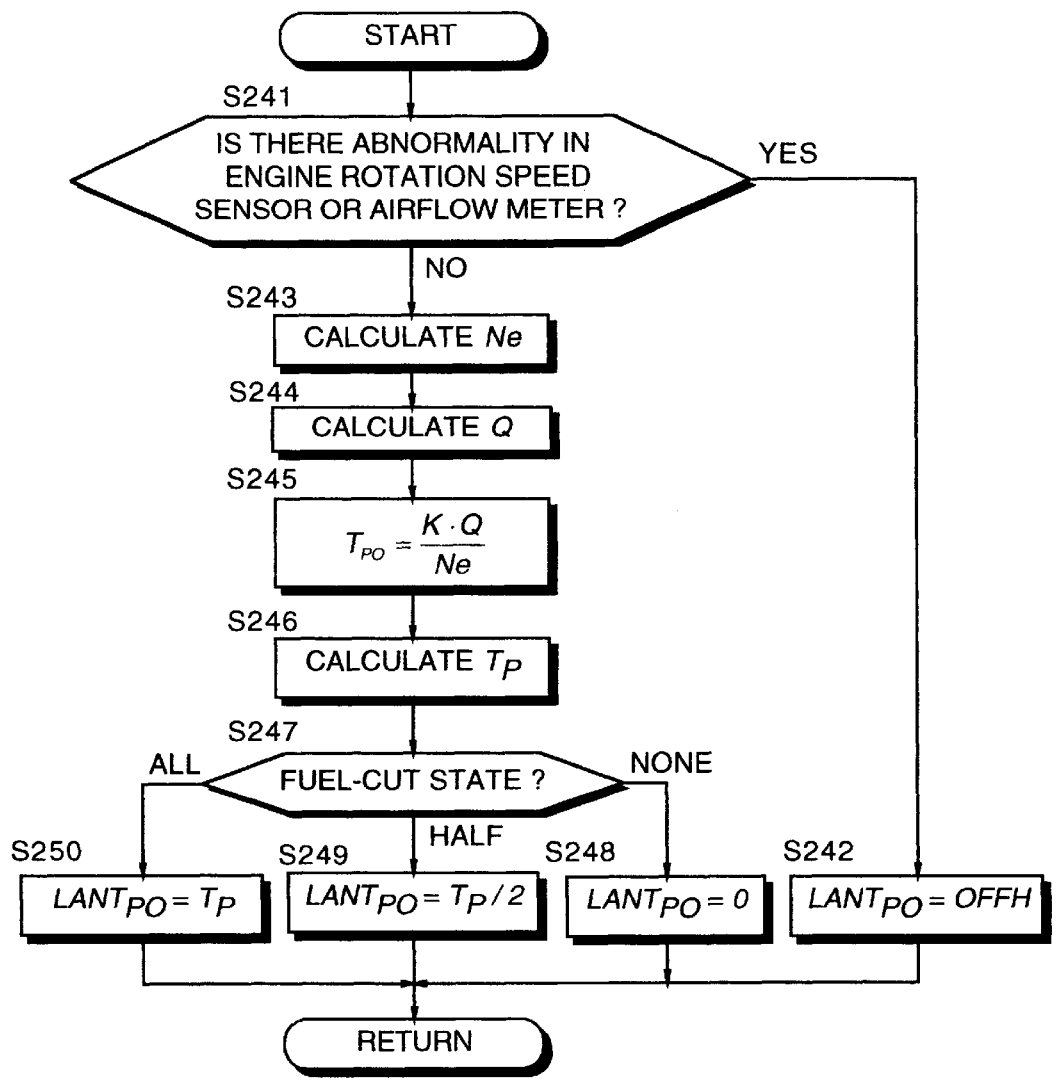
FIG. 6 is a flowchart describing a subroutine for calculating a fuel injection pulse width signal $LANT_{PO}$ performed by the controller.

FIG. 6 shows a subroutine for calculating the engine fuel injection pulse width $LANT_{PO}$. This subroutine corresponds to the function of the abnormality determining unit 101, engine fuel injection pulse width calculating unit 91, pulse width signal processing unit 92, fuel-cut operating unit 93, communication fault detecting unit 94 and data transfer unit 95 in FIG. 3B.

First, in a step S241, it is determined if there is an abnormality in either of the engine rotation speed sensor 68 and airflow meter 59. This step corresponds to both the steps S231 and S232. except that an abnormality in the input rotation sensor 64 and output rotation speed sensor 65 is not determined. When an abnormality is found in the step S241, the subroutine proceeds to a step S242, the fuel injection pulse width signal $LANT_{PO}$ is set to OFFH which indicates an abnormality and the subroutine is terminated.

When no abnormality is found in any sensor, the subroutine proceeds to steps S243 and S244, and the engine rotation speed Ne and engine intake amount Q are respectively calculated based on the signals from these sensors.

In a subsequent step S245, the engine output torque is calculated from the engine rotation speed Ne and engine intake amount Q, and then multiplied by the constant K so as to obtain the basic pulse width $T_{PO}$.

In a subsequent step S246, the fuel injection pulse width $T_P$ corresponding to the engine intake air amount is calculated by applying a correction to the basic pulse width $T_{PO}$ with respect to the response delay of the engine intake system.

In a subsequent step S247. the fuel-cut state in the engine is determined based on the signals indicative of the number of cylinders wherein fuel-cut is being performed which is input from the fuel-cut operating unit 93.

When all the cylinders are in the fuel-cut state, the fuel injection pulse width signal $LANT_{PO}$ is set equal to 0 in a step S248. When a half of the cylinders are in the fuel-cut state, the signal $LANT_{PO}$ is set equal to $T_P/2$ in a step S249. When there is no cylinder which is in the fuel-cut state, the signal $LANT_{PO}$ is set equal to $T_P$ in a step S250. After setting the signal $LANT_P$ in this way, the subroutine is terminated.

Now, returning to the main routine of FIG. 4, after setting the limited final target speed ratio LmDRatio, the main routine proceeds to a step S217 and the transient target speed ratio RatioO which is the target speed ratio for every control cycle is calculated.

Figure 7:
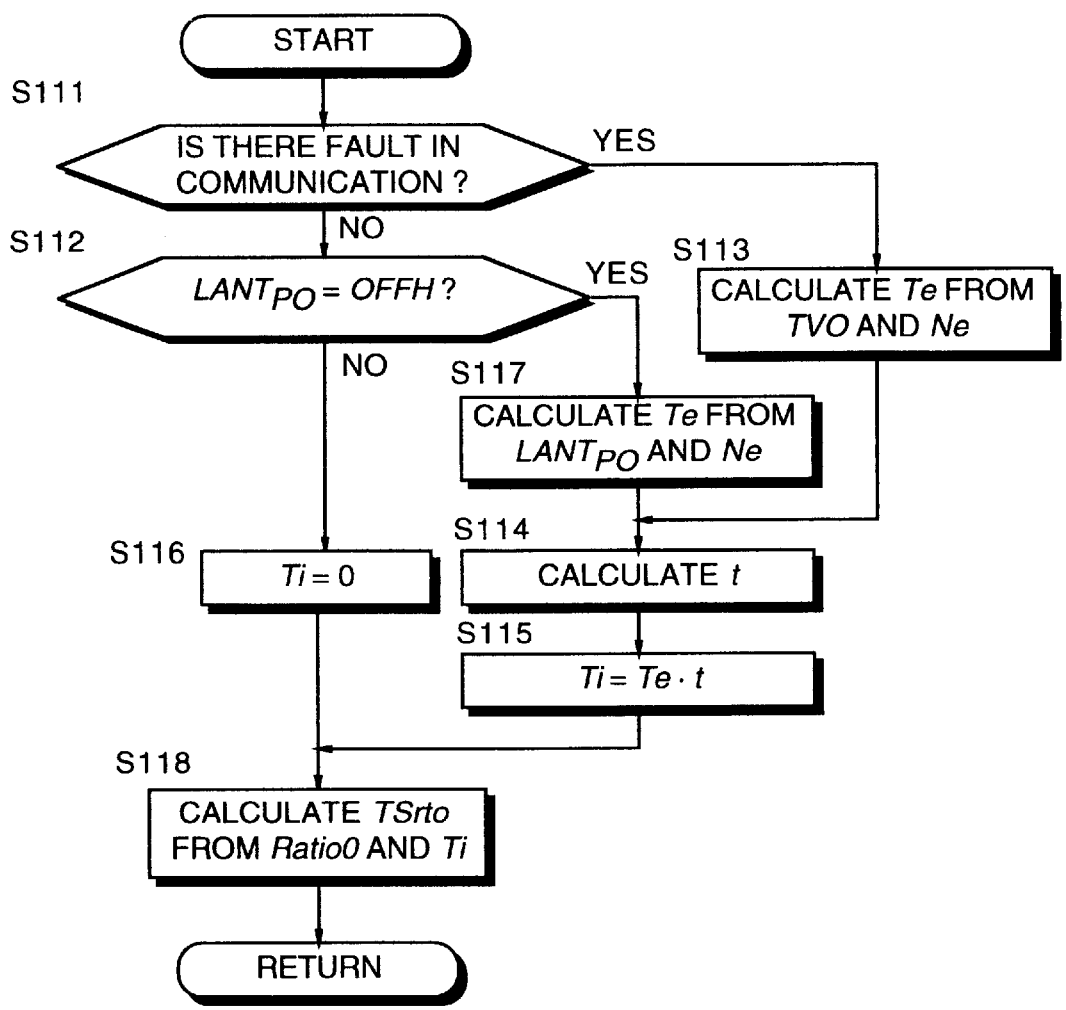
FIG. 7 is a flowchart describing a subroutine for calculating a torque shift compensated speed ratio TSrto performed by the controller.

In a subsequent step S218. torque shift compensated speed ratio TSrto is calculated by using a subroutine shown in FIG. 7.

This subroutine corresponds to the speed ratio calculating unit 99, torque ratio calculating unit 100, input torque calculating unit 76 and torque shift compensation speed ratio computing unit 77 shown in FIG. 3A.

In this subroutine, in a step S 111, it is determined if there is a fault in the communication between the pulse width signal processing unit 92 and communication fault detecting unit 94 according to absence or presence of the pulse width signal $LANT_{PO}$. If the signal is absent, it is determined there is a fault in the communication while if the signal is present, it is determined there is no fault in the communication.

When a fault is found in the step S111, the subroutine proceeds to a step S113 and the engine torque Te is obtained from the throttle opening TVO and engine rotation speed Ne by referring to an engine performance map previously stored in the controller 61. The subroutine subsequently proceeds to a step S114.

When no fault is detected, it is determined in a step SI 12, if the pulse width signal $LANT_{PO}$ is OFFH, i.e., if an abnormality has been found in any of the engine rotation speed sensor 68 and airflow meter 59.

When $LANT_{PO}$ is OFFH in the step S112, the subroutine proceeds to a step S116, the input rotation torque Ti is set equal to 0, and the subroutine proceeds to a step S118.

The reason why the input rotation torque Ti is set equal to 0 is that the engine output torque can not be calculated when any of the engine rotation speed sensor 68 and airflow meter 59 has an abnormality. By setting the input rotation torque Ti equal to 0, the torque shift error correction is substantially prevented from being performed.

When $LANT_{PO}$ is not OFFH in the step S112, i.e., when no abnormality is found in the engine rotation speed sensor 68 nor in the airflow meter 59, the subroutine proceeds to a step S117, the engine output torque Te is obtained from the pulse width signal $LANT_{PO}$ and engine rotation speed Ne by referring to another engine performance map previously stored in the controller 61.

Figure 15:
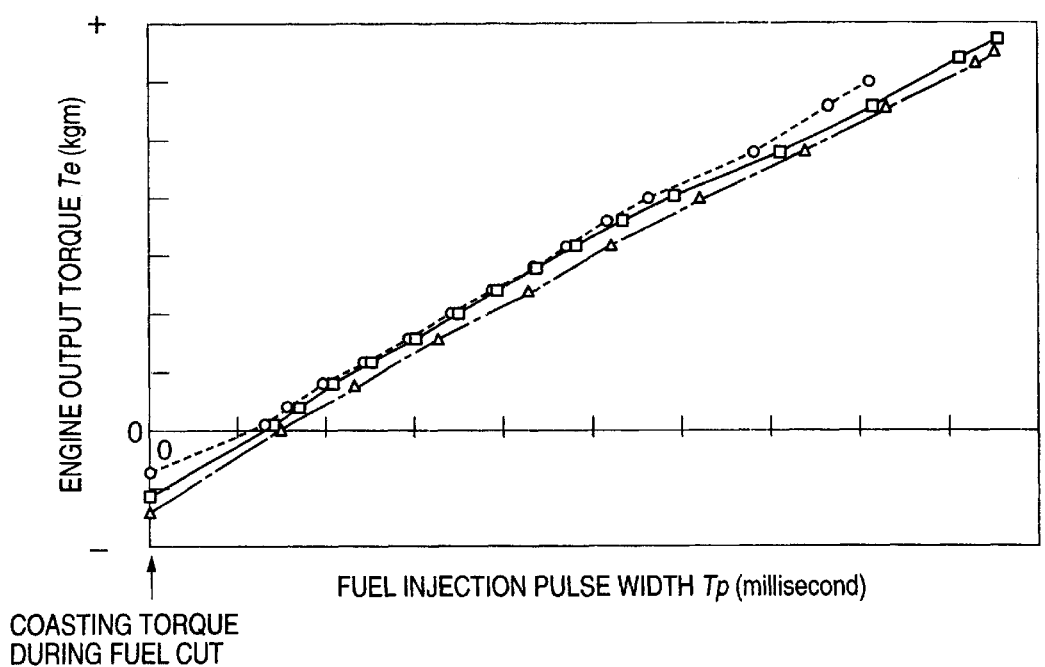
FIG. 15 is a diagram explaining a relation between an engine torque Te and a fuel injection pulse width Tp according to experiments by the inventors of this invention.

The maps used in the step S113 and S117 are different. In both maps the engine output torque is defined with respect to the engine speed Ne and engine load. When no abnormality is detected in the engine and sensors and no fault in the communication, the pulse width signal $LANT_{PO}$ is the most precise expression of the engine load. According to experiments by the inventors, the fuel injection pulse width Tp and the engine output torque Te have almost a linear relation as shown in FIG. 15. In this figure, three lines are shown according to the engine rotation speed. Among the three lines, the broken line denotes the lowest engine rotation speed, the dotted line denotes the intermediate engine rotation speed and the solid line denotes the highest engine rotation speed. However, as can be seen form this figure, the fuel injection pulse width Tp and the engine output torque Te have a linear relation irrespective of the engine rotation speed.

When there is an abnormality as described, however, the pulse width signal $LANT_{PO}$ is no more reliable, hence the throttle opening TVO is used instead as the value representing the engine load.

Figure 16:
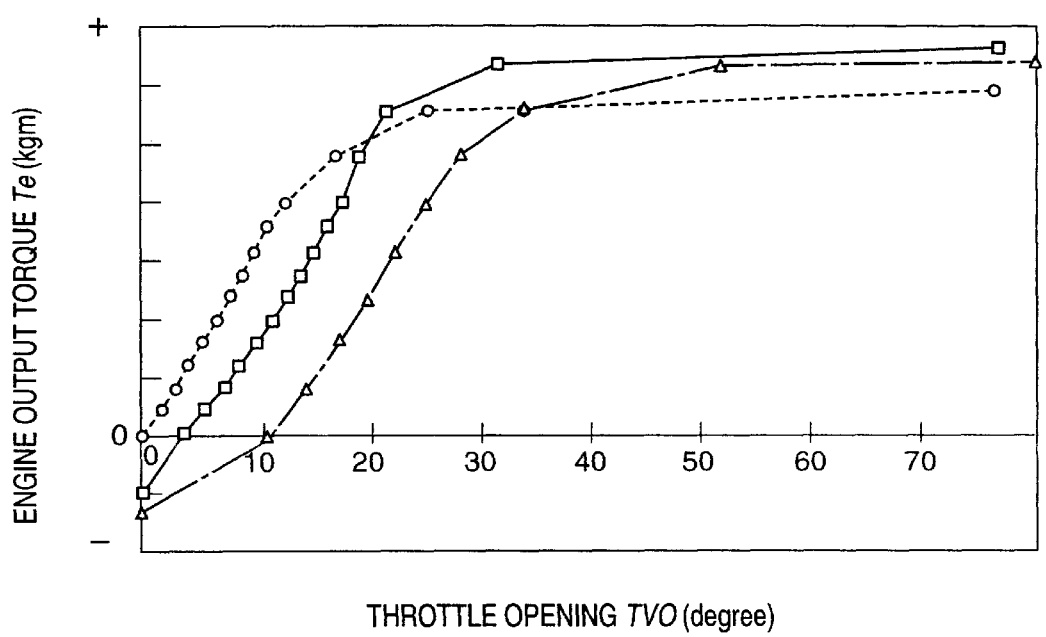
FIG. 16 is a diagram explaining a relation between the engine torque Te and throttle opening TVO according to experiments by the inventors.

FIG. 16 shows the throttle opening TVO and the engine output torque Te according to experiments by the inventors. The throttle opening TVO is also considered to represent the engine load, but as can be seen from the figure, the relation between the throttle opening TVO and the engine output torque Te is not linear. Further the engine output torque Te varies at an identical throttle opening TVO depending on the engine rotation speed.

Figure 17:
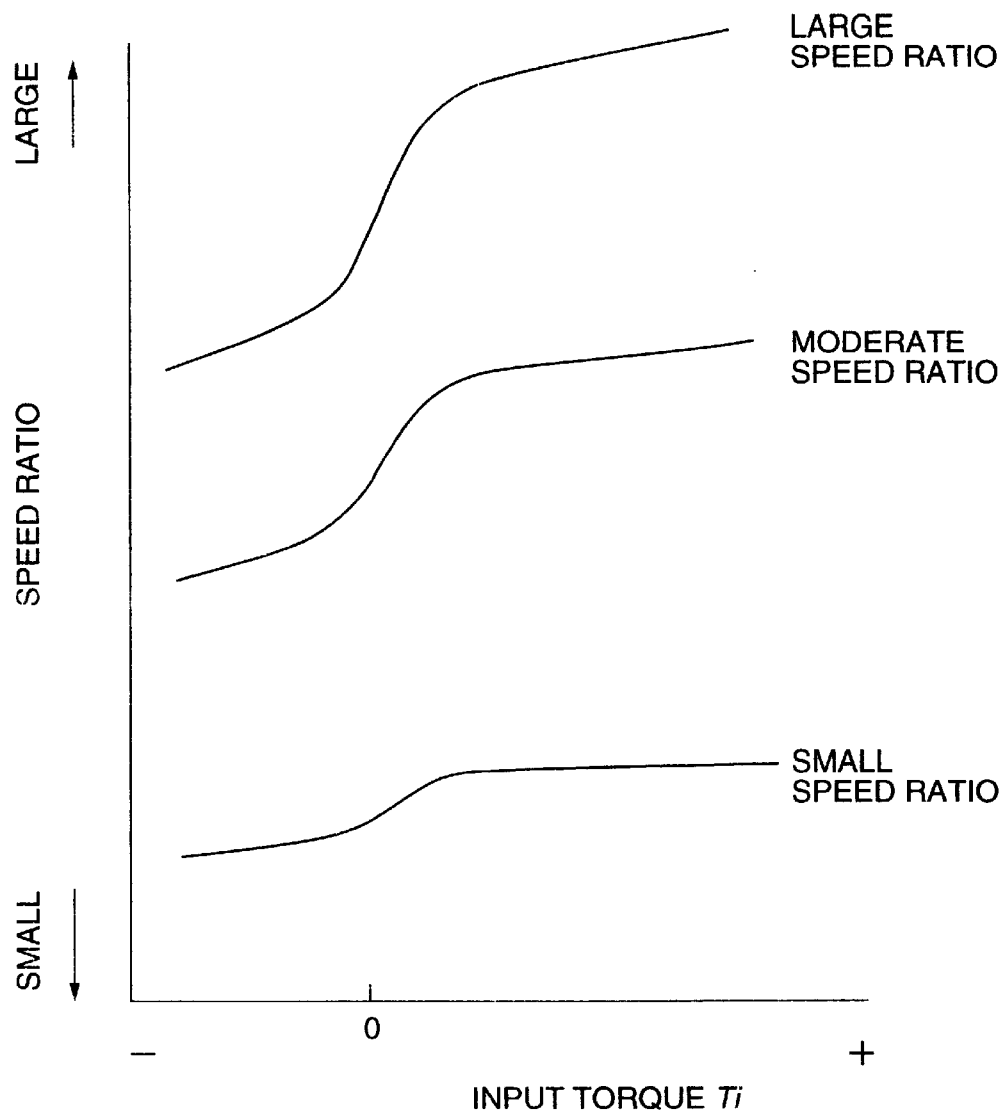
FIG. 17 is a diagram showing an effect of a variation of an input torque on the speed ratio of the transmission.

FIG. 17 shows a relation between the torque shift error and the speed ratio of the transmission according to experiments by the inventors.

According to this figure, the speed ratio variation due to the variation of the input torque is significant in a regions where the input torque is small irrespective of the speed ratio. This region corresponds to the throttle opening TVO between 0 and ⅛.

In FIG. 16, however, the engine output torque Te largely varies depending on the engine rotation speed in the region where the throttle opening TVO is between 0 and ⅛. It is clear that the estimation of the engine output torque Te based on the throttle opening TVO is much less precise than the estimation based on the fuel injection pulse width Tp.

In the step S117 the map based on the fuel injection pulse width $LANT_{PO}$ is used for the calculation of the engine output torque Te. In the step S113, however, the fuel injection pulse width $LANT_{PO}$ is not available, so the map based on the throttle opening TVO is used for the calculation of the engine output torque Te.

After the engine output torque Te is obtained in this way, the subroutine proceeds to the step S114 and the torque ratio t is calculated.

In a subsequent step S115, the transmission input torque Ti is finally calculated by multiplying the engine output torque Te by the torque ratio t. After the calculation of transmission input torque Ti, the subroutine proceeds to the step S118.

In the step SI 18, the torque shift compensated speed ratio TSrto is calculated based on the transmission input torque Ti and the transient target speed ratio RatioO obtained in the step S217 of the main routine by looking up the map stored beforehand in the controller 61 as described earlier.

After calculating the torque shift compensated speed ratio TSrto by the above subroutine, the main routine proceeds to a step S219A where the speed ratio feedback correction amount FBrto is calculated, and to a step S219B where the limited speed ratio feedback correction LmFBrto is calculated.

This calculation is performed by the subroutines of FIGS. 8–13 described later.

In a step S220, the error corrected transient target speed ratio TSRatioO is computed by the following equation. This is equivalent to the function of the adder 70 in the block diagram of FIG. 3.

$$TSRatioO = RatioO + TSrto$$

where,

RatioO=transient target speed ratio, and

TSrto=torque shift compensated speed ratio.

Also, the feedback corrected transient target speed ratio DsrRTO is calculated by the following equation. This is equivalent to the function of the adder 85 in FIG. 3.

$$DsrRTO = TSrto + LmFBfto$$

where,

LmFBrto=limited feedback correction amount.

In steps S221-S225, the feedback corrected transient target speed ratio DsrRTO is limited to a range between the final speed ratio command upper limiting value LIMRTOMAX and the final speed ratio command lower limiting value LIMRTOMIN, and the limited speed ratio command value LmDsrRTO based on this limitation is calculated. This processing is equivalent to the function of the target step number calculating unit 82 in the block diagram of FIG. 3A.

If the feedback corrected transient target speed ratio DsrRTO is smaller than the final speed ratio command upper limiting value LIMRTOMAX in the step S221, and greater than the final speed ratio command lower limiting value LIMRTOMIN in the step S222, the limited speed ratio command value LmDsrRTO is set equal to the feedback corrected transient target speed ratio DsrRTO in a step S223.

If DsrRTO≧LIMRTOMAX in the step S221, the limited speed ratio command value LmDsrRTO is set equal to the final speed ratio command upper limiting value LIMRTOMAX in a step S224.

If DsrRTO<LIMRTOMIN in the step S222, the limited speed ratio command value LmDsrRTO is set equal to the final speed ratio command lower limiting value LIMRTOMIN in a step S225.

In a step S226, the target step number DsrSTP of the step motor 4 for attaining the limited speed ratio command value LmDsrRTO is calculated by looking up the map as mentioned above.

This step is equivalent to the function of the target step number calculating unit 86 in the block diagram of FIG. 3A.

In the following step S227, the physical operating limit rate of the step motor 4 is determined based on the oil temperature TMP of the transmission. This step is equivalent to the function of the step motor drive rate determining unit 88 in the block diagram of FIG. 3A.

In a final step S228, the command signal Astep is calculated by correcting the target step number DsrSTP calculated in the step S226 based on the physical operating limit rate determined in the step S227. This signal Astep is output to the step motor 4, and the main routine is terminated. The step S228 is equivalent to the function of the step motor drive position command calculating unit 87 in the block diagram of FIG. 3A.

Next, the subroutine of FIGS. 8–13 will be described.

Figure 8:
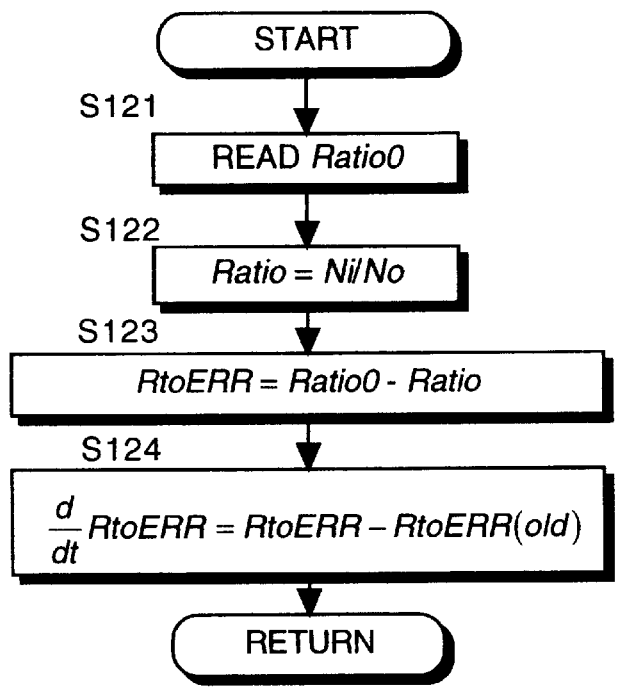
FIG. 8 is a flowchart describing a subroutine for calculating a speed ratio deviation RtoERR of a transient target speed ratio RatioO from a real speed ratio Ratio performed by the controller.

FIG. 8 shows a subroutine for calculating the speed ratio deviation RtoERR.

This subroutine is equivalent to the function of the real speed ratio calculating unit 78 and the speed ratio deviation calculating unit 79 in the block diagram of FIG. 3A.

First, the transient target speed ratio RatioO is read in a step S121. In a step S122, the input rotation speed Ni is divided by the output rotation speed No to calculate the real speed ratio Ratio of the continuously variable transmission.

In a step S123, the real speed ratio Ratio is deducted from the transient target speed ratio RatioO to calculate the speed ratio deviation RtoERR.

Further, in a step S124, a deviation between the speed ratio deviation RtoERR and the speed ratio deviation RtoERR(old) calculated on the immediately preceding occasion the routine was executed, i.e., 10 milliseconds before, is calculated as a differential value of speed ratio deviation $$\frac{d}{dt}RtoERR.$$

Figure 9:
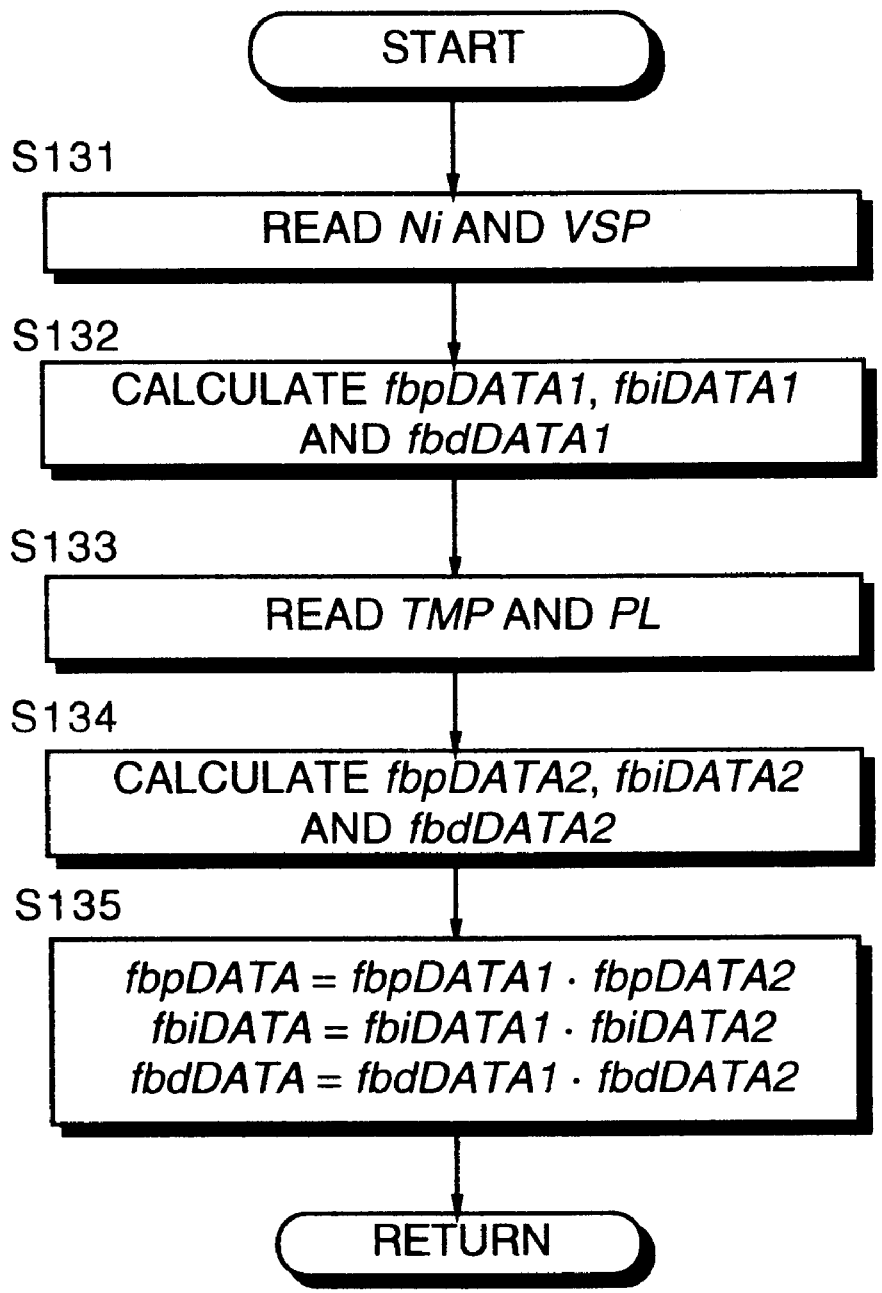
FIG. 9 is a flowchart describing a subroutine for calculating feedback gains fbpDA TA, fbiDATA and fbdDATA performed by the controller.

FIG. 9 shows a subroutine which calculates the PID control feedback gain. This subroutine is equivalent to the functions of the first feedback gain calculating unit 80, the second feedback gain calculating unit 81 and the feedback gain calculating unit 83 in the block diagram of FIG. 3A.

Describing this subroutine, first in a step S131, the vehicle speed VSP and input rotation speed Ni of the continuously variable transmission are read.

In a step S132, a first proportional control feedback gain fbpDATA1, first integral control feedback gain fbiDATA1 and first differential control feedback gain fbdDATA1 are calculated by looking up the maps stored beforehand in the controller 61 as mentioned above based on VSP and Ni.

In a step S133, the oil temperature TMP and the line pressure $P_L$ are read.

In a step S134, a second proportional control feedback gain fbpDATA2, second integral control feedback gain fbiDATA2 and second differential control feedback gain fbdDATA2 are calculated by looking up the maps stored beforehand in the controller 61 as mentioned above based on TMP and $P_L$.

In a step S135, the proportional control feedback gain fbpDATA, integral control feedback gain fbiDATA and differential control feedback gain fbdDATA are calculated by multiplying the first gains by corresponding second gains.

Figure 10:
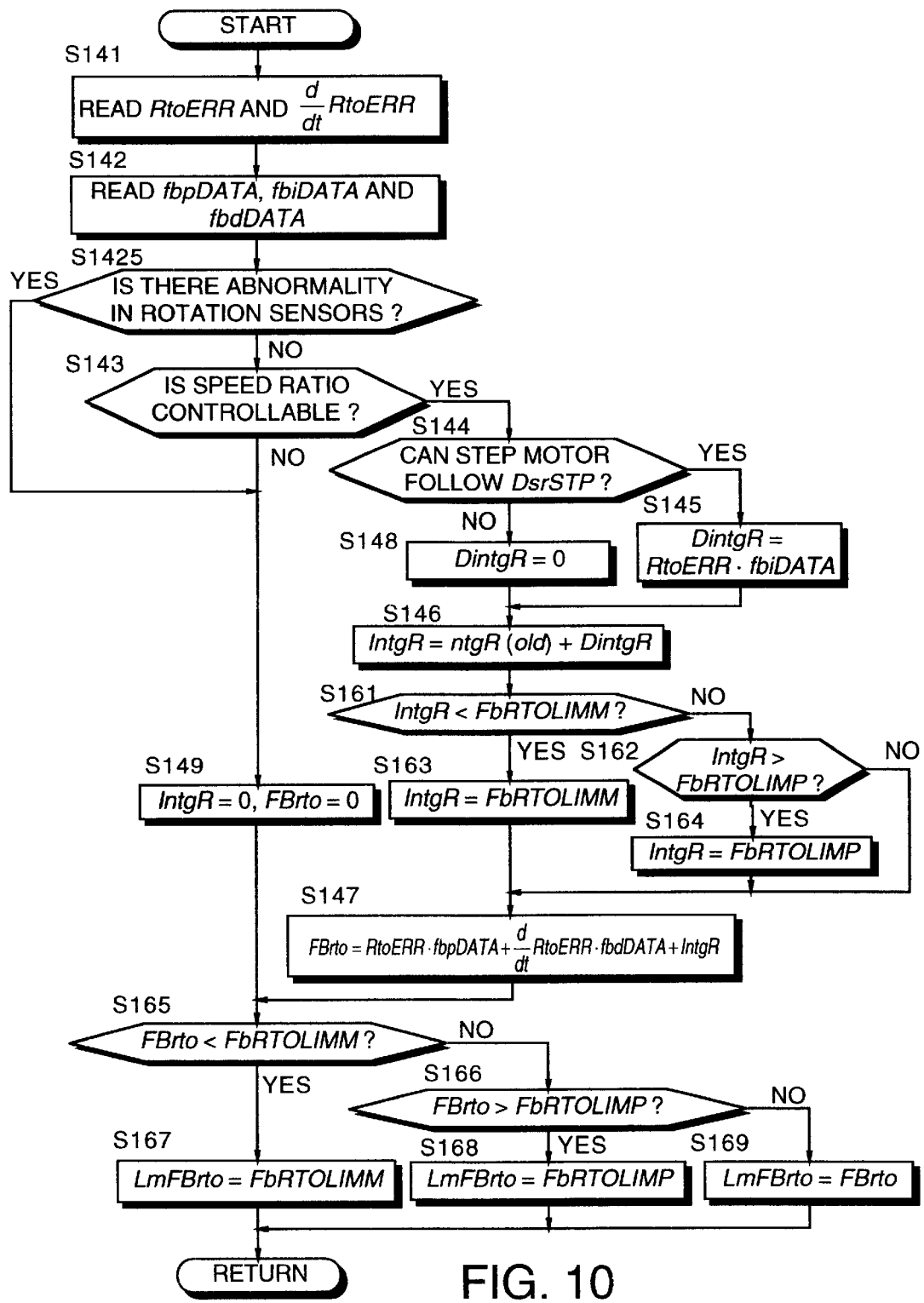
FIG. 10 is a flowchart describing a subroutine for the calculating a limited speed ratio feedback correction amount LmFBrto performed by the controller.

FIG. 10 shows a subroutine for calculating the speed ratio feedback correction amount FBrto due to PID control, and the limited speed ratio feedback correction amount LmFBrto.

This subroutine is equivalent to the functions of the PID control unit 84 and the speed ratio feedback correction amount limiting unit 90 in the block diagram of FIG. 3A.

In this subroutine, in a step S141, the speed ratio deviation RtoERR and its differential value $$\frac{d}{dt}RtoERR,$$

both of which were calculated by the subroutine of FIG. 8, are read. In the next step S142, the feedback gains fbpDATA, fbiDATA and fbdDATA which were found in the subroutine of FIG. 9, are read.

In a subsequent step S1425, it is determined if there is an abnormality in any of the input rotation speed sensor 64, output rotation speed sensor 65 and engine rotation speed sensor 68. This step is equivalent to the step S231 in FIG. 5.

When an abnormality is found in any of the sensors, the subroutine proceeds to a step S149. When no abnormality is found, the subroutine proceeds to a step S143.

In the step S143, it is determined from the vehicle speed VSP and the input rotation speed Ni of the transmission whether or not the speed ratio is controllable. When the vehicle speed VSP and the input rotation speed Ni are 0, the vehicle is not running, the speed ratio of the continuously variable transmission cannot be varied, and it is determined that the speed ratio is not controllable.

From the above determination, if the speed ratio is controllable, the subroutine proceeds to a step S144 and it Is determined whether or not the step motor 4 can follow the target step number DsrSTP. The target step number DsrSTP is calculated by the main routine in the step S103 as described above, therefore, the target step number DsrSTP used here is the value calculated on the immediately preceding occasion when the main routine was executed. That is, in the step S144, it is determined whether or not the target step number DsrSTP calculated on the immediately preceding occasion the routine was executed, can be attained during the period until the routine is executed on the present occasion.

Figure 13:
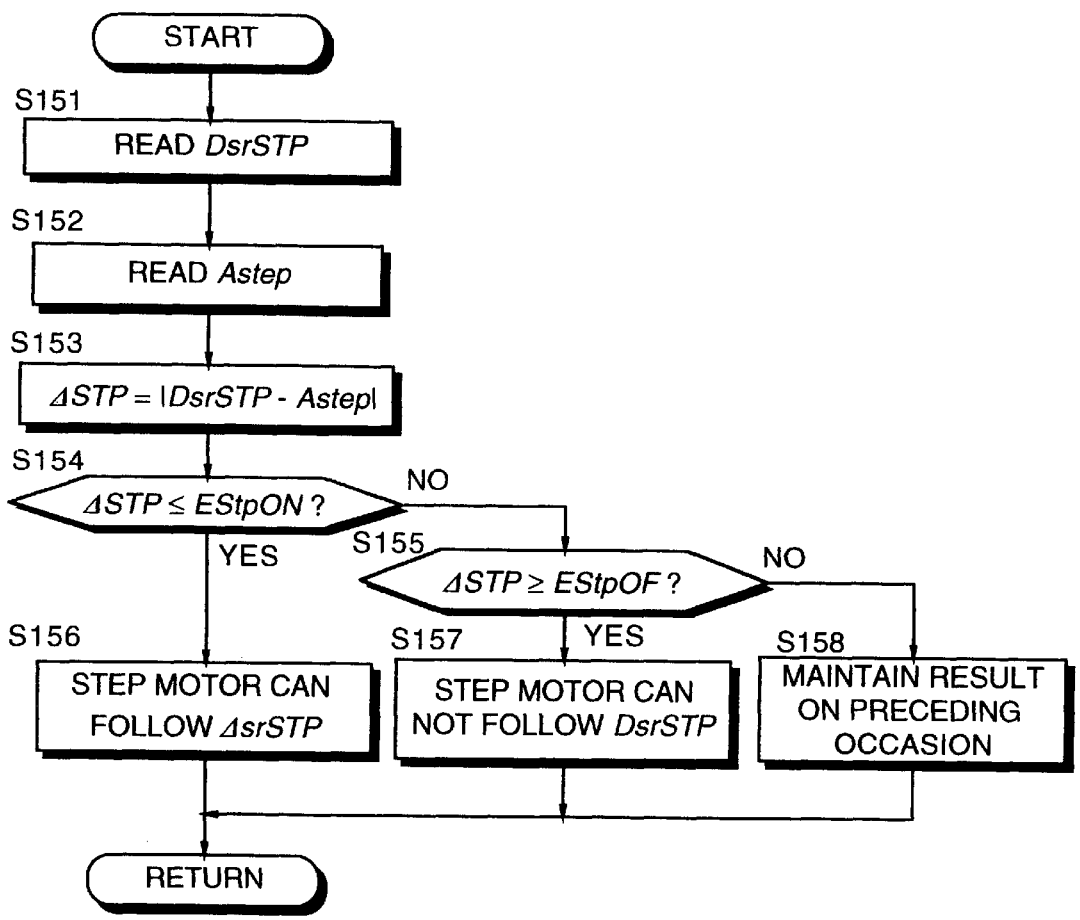
FIG. 13 is a flowchart describing a subroutine for determining a recoverability of a deviation by a step motor performed by the controller.

This determination is performed by the subroutine shown in FIG. 13.

This subroutine will be described referring to FIG. 13.

First, in a step S151, the target step number DsrSTP is read.

This is the value which was calculated on the immediately preceding occasion the main routine was executed, as already stated.

In a following step S152, the command signal Astep output to the step motor 4 on the immediately preceding occasion the main routine was executed, is read. This command signal Astep is considered to be the present position of the step motor 4. In a next step S153, the deviation ASTP between the target step number DsrSTP and speed change command signal Astep is calculated by the following equation.

$$\Delta STP = |DsrSTP - Astep|$$

In a step S154, it is determined whether or not the deviation ΔSTP is equal to or less than a first critical deviation EStpON. When the deviation ASTP is larger the value EStpON, in a step S155, it is determined whether or not the deviation ΔSTP is equal to or greater than a second critical deviation EStpOF.

These first and second critical deviations are determined in the step S104 of the main routine from the limiting drive rate of the step motor 4. Therefore, these values are also based on the data when the main routine was performed on the immediately preceding occasion.

Here, the reason for setting the first and second critical deviations EStpON and EStpOF is in order to introduce hysteresis.

In the step S154, when the deviation ASTP is less than the first critical deviation EStpON, it is determined in a step S156 that the step motor 4 can follow the target step number DsrSTP.

On the other hand, when the deviation ΔSTP is equal to or greater than the second critical deviation EStpOF, it is determined in a step S157 that the step motor 4 cannot follow the target step number DsrSTP.

In the step S155, when the deviation ASTP is less than the second critical deviation EStpOF, the subrou tine proceeds to a step S158 and the determining result on the immediately preceding occasion, i.e., whether or not the step motor 4 can follow the target step number DsrSTP, is maintained as it is.

When it is determined by this subroutine that the step motor 4 can follow the target step number DsrSTP, the determining result of the step S144 of the subroutine of FIG. 10 is affirmative.

In this case, an integral correction amount increase value DintgR with respect to the speed ratio feedback correction amount, during the period from the immediately preceding occasion the main routine was executed to the present occasion when the main routine is executed, is calculated by the following equation in a step S145.

DintgR=RtoERR·fbiDATA

Further, in a step S146, the integral correction amount increase value DintgR is added to an integral correction amount IrtgR (old) which was calculated on the immediately preceding occasion, by the following equation so as to calculate the integral correction amount present value IntgR.

In the following steps S161–S164, the integral correction amount present value IntgR is limited by the decrease correction limiting value FbRTOLIMM, and the increase correction limiting value FbRTOLIMP. The method of determining these limiting values FbRTOLIMM and FbRTOLIMP will be described later.

In the step S161, it is determined whether or not the integral correction amount present value IntgR is less than the decrease correction limiting value FbRTOLIMM. As both are negative values, the fact that the integral correction amount present value IntgR is less than the decrease correction limiting value FbRTOLIMM means that the absolute value of the former is larger than the absolute value of the latter. In this case, the integral correction amount present value IntgR is set equal to the feedback correction amount limiting value FbRTOLIMM.

When the integral correction amount present value IntgR is equal to or greater than the decrease correction limiting value FbRTOLIMM, it is determined in the step S162 whether or not the integral correction amount present value IntgR Is larger than the increase correction limiting value FbRTOLIMP.

When the integral correction amount present value IntgR is larger than the increase correction limiting value FbRTOLIMP, the integral correction amount present value Intgr is set equal to the increase correction limiting value FbRTOLIMP in the step S164.

When the integral correction amount present value IntgR is less than the increase correction limiting value FbRTOLIMP, the integral correction amount present value IntgR is used without modification.

Using the integral correction amount present value IntgR limited in this way, the speed ratio feedback correction amount FBrto is calculated by the following equation in a step S147.

$$FBrto = RtoERR \cdot fbpDATA + \left(\frac{d}{dt}RtoERR\right) \cdot fbdDATA + IntgR$$

On the other hand, if it is determined in the step S144 that the step motor 4 cannot follow the target step number DsrSTP, the subroutine proceeds to a step S148. Here, the integral correction amount increase value DintgR on the present occasion is set to 0, and the routine proceeds to the step S146.

In this case, the integral correction amount IntgR is maintained at the same value as on the immediately preceding occasion the main routine was executed, i.e., IntgR (old). Hence, when the state where the step motor 4 cannot follow the target step number DsrSTP continues, the feedback correction integral correction amount is prevented from increasing cumulatively.

In steps S165–S169, the speed ratio feedback correction amount FBrto found in the step S147 Is limited by the decrease correction limiting value FbRTOLIMM and the increase correction limiting value FbRTOLIMP as in the steps S161–S164.

That is, when FBrto<FbRTOLIMM in the step S165, the limited speed ratio feedback correction amount LmFBrto is set equal to the decrease correction limiting value FbR-TOLIMM in the step S167. Conversely, when FBrto>FbRTOLMP in the step S166, the limited speed ratio feedback correction amount LmFBrto is set equal to the increase correction limiting value FbRTOLIMP in the step S168.

As a result of the determining of the steps S165, S166, when FbRTOLIMM≦FBrto≦FbRTOLIMP, in the step S169, the limited speed ratio feedback correction amount LmFBrto is set equal to the speed ratio feedback correction amount FBrto calculated in the step S147.

When it is determined in the step S143 that the continuously variable transmission is not in a state where the speed ratio can be controlled, the integral correction amount IntgR and the speed ratio feedback correction amount FBrto are both reset to 0 in a step S149. As a result, in subsequent processes, the limited speed ratio feedback correction amount LmFBrtoO is also reset to 0 in the step S169.

Next, the method of determining the negative feedback correction amount limiting value FbRTOLIMM and positive feedback correction amount limiting value FbRTOLIMP will be described referring to FIGS. 11 and 12.

Figure 11:
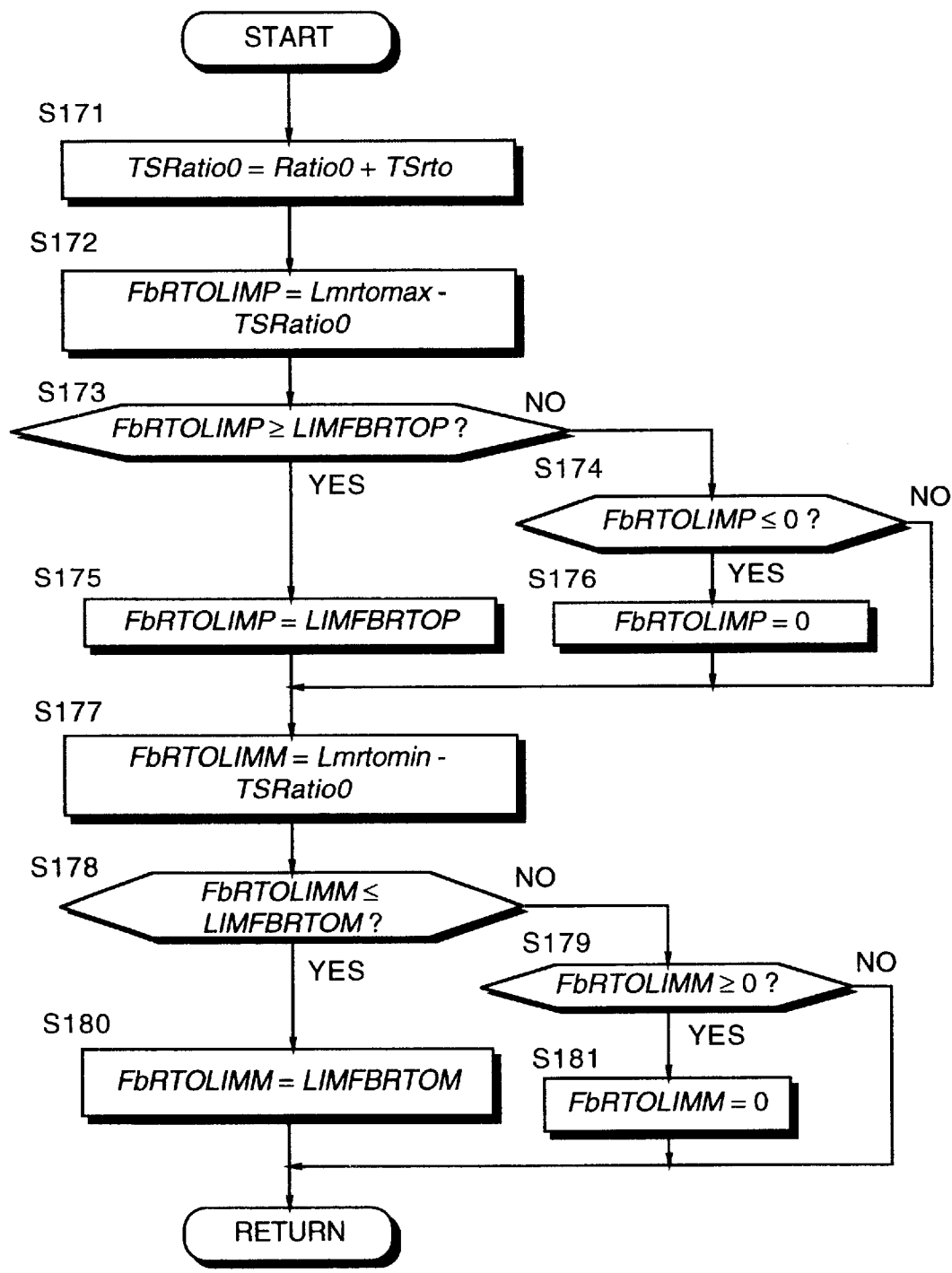
FIG. 11 is a flowchart describing a subroutine for calculating feedback correction limiting values FbRTOLIMP and FbRTOLIMM performed by the controller.
Figure 12:
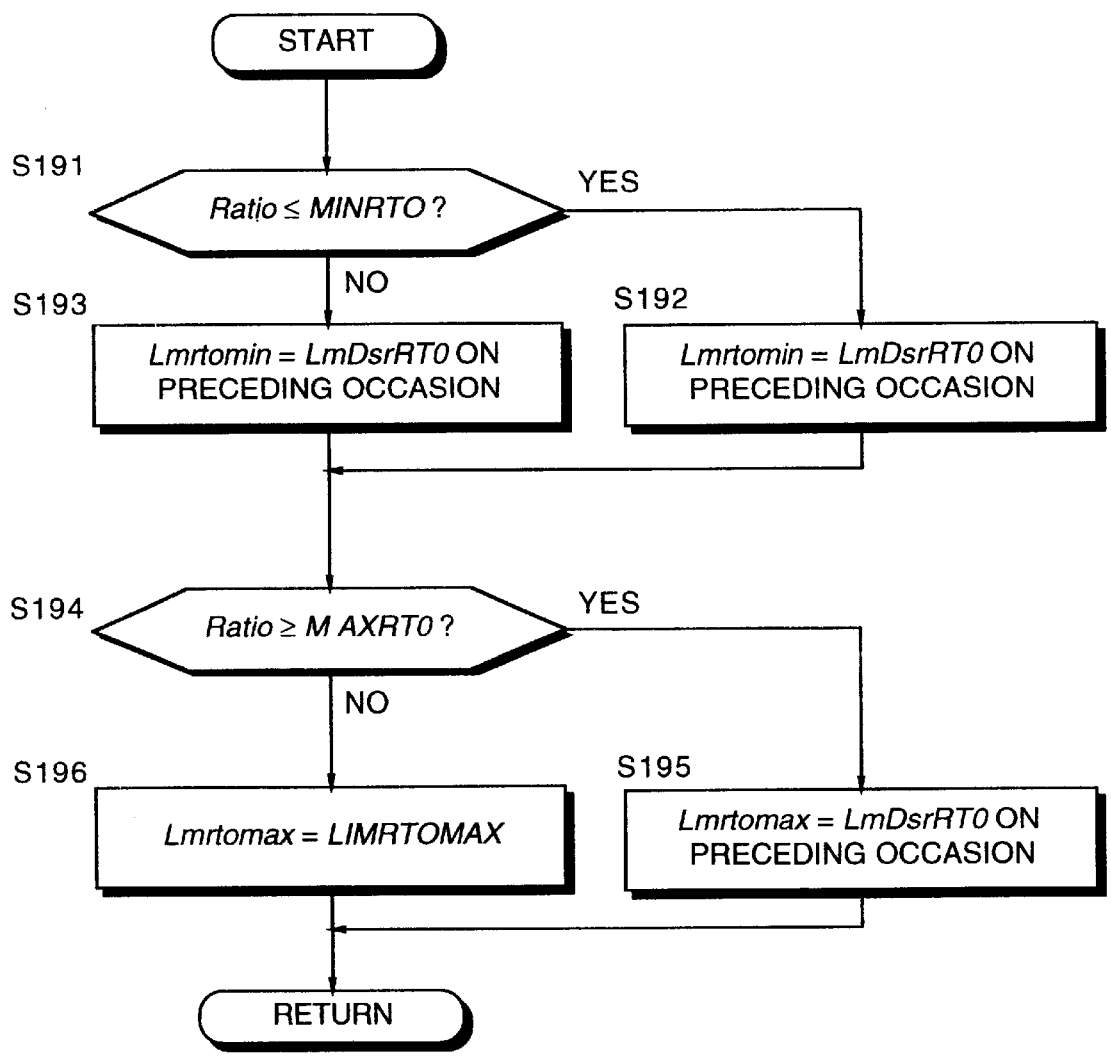
FIG. 12 is a flowchart describing a subroutine for calculating controllable maximum speed ratio Lmrtomax and a controllable minimum speed ratio Lmrtomin performed by the controller.

FIG. 11 shows a subroutine for calculating the limiting values FbRTOLIMM and FbRTOLIMP, and FIG. 12 shows a subroutine for calculating the controllable minimum speed ratio Lmrtomin and controllable maximum speed ratio Lmrtomax which are used in the calculation.

In FIG. 11, in a step S171, the error corrected transient target speed ratio TSRatioO is calculated as in the above-mentioned step S220.

In a step S172, the increase correction limiting value FbRTOL IMP is calculated by deducting the error corrected transient target speed ratio TSRatioO from the maximum controllable speed ratio Lmrtomax calculated by the subroutine of FIG. 12 described later.

In the next step S173, it is determined whether or not this limiting value FbRTOLIMP is equal to or greater than a positive critical value LIMFBRTOP equivalent to a step increase operating limit of the step motor 4.

When the limiting value FbRTOLIMP is equal to or greater than the positive critical value LIMFBRTOP, the limiting value FbRTOLIMP is set equal to the positive critical value LIMFBRTOP in a step S175. When the limiting value FbRTOLIMP is less than the positive critical value LIMFBRTOP, it is determined whether or not the increase correction limiting value FbrTOLIMP is a negative value in a step S174.

When the increase correction limiting value FbRTOLIMP is a negative value, the limiting value FbRTOLIMP is reset to 0 in a step S176. When the increase correction limiting value FbRTOLIMP is a value between 0 and the positive critical value LIMFBRTOP, a limit is not applied to the increase correction limiting value FbRTOLIMP.

In a step S177, the decrease correction limiting value FbRTOLIMM is calculated by subtracting the error corrected transient target speed ratio TSRatioO from the controllable minimum speed ratio Lmrtomin calculated by the subroutine in FIG. 102.

In the next step S178, it is determined whether or not this limiting value FbRTOLIMM is less than a negative critical value LIMFBRTOM equivalent to a step decrease operating limit of the step motor 4. When the decrease correction limit value FbRTOLIMM is less than the negative critical value LIMFBRTOM, the decrease correction limiting value FbRTOLIMM is set equal to the negative critical value LIMFBRTOM in a step S180. When the decrease correction limiting value FbRTOLIMM is larger than the negative critical value LIMFBRTOM, it is determined whether or not the decrease correction limiting value FbRTOLIMM is a positive value in the step S179.

When the decrease correction limiting value FbRTOLIMM is a positive value, the limiting value FbRTOLIMMis reset to 0 in a step S181.

When the decrease correction limiting value FbRTOLIMM is a value between 0 and the negative critical value LIMFBRTOM, a limit is not applied to the decrease correction limiting value FbRTOLIMM Next, the subroutine for calculating the controllable minimum speed ratio Lmrtomin and controllable maximum speed ratio Lmrtomax will be described referring to FIG. 12.

First, in a step S191, it is determined whether or not the real speed ratio Ratio is less than a minimum speed ratio MINRTO based on the specification of the hardware of the continuously variable transmission. Normally, although the real speed ratio Ratio does not fall below the minimum speed ratio MINRTO, such a case may occur due to an external disturbance such as a torque shift. If Ratio≦MINRTO, the controllable minimum speed ratio Lmrtomin is set equal to the limited speed ratio command value LmDsrRTO on the immediately preceding occasion in a step S192.

On the other hand, if Ratio>MINRTO, the controllable minimum speed ratio Lmrtomin is set equal to the speed ratio command lower limiting value LIMRTOMIN which was used in the steps S221–S225 of FIG. 4.

Next, in a step S194, it is determined whether or not the real speed ratio Ratio is equal to or greater than a maximum speed ratio MAXRTO based on the specification of the hardware of the continuously variable transmission. Normally, although the real speed ratio Ratio does not become greater than the maximum speed ratio MAXRTO, such a case may occur due to an external disturbance such as a torque shift. If Ratio≧MINRTO, the maximum controllable speed ratio Lmrtomax is set equal to the limited speed ratio command value LmDsrRTO on the immediately preceding occasion in a step S195.

On the other hand, if Ratio<MAXRTO, in the step S196, the controllable maximum speed ratio Lmrtomax is set equal to the speed ratio command upper limiting value LIMRTOMAX which was used in the steps S221–S225 of FIG. 4.

Next, the subroutine for determining abnormality in the rotation sensors will be described referring to FIGS. 18A and 18B. This subroutine corresponds to the processing in the steps S231 and S1425.

An abnormality in the engine rotation speed sensor 68, input rotation speed sensor 64 and output rotation speed sensor 65 is determined in this subroutine.

The subroutine first determine if there is a break down of a signal path in the sensors. This break down includes a snapping of lead wire and a contact failure of a connector.

The subroutine determine there is an abnormality when no signal is input from these sensors.

In a step S1101, it is determined if signal is being input from the output rotation speed sensor 65. In a subsequent step S1102, it is determined if signal is being input from the input rotation speed sensor 64. In a subsequent step S1103, it is determined if signal is being input from the engine rotation speed sensor 68.

If it is determined that no signal is input from the output rotation speed sensor 65 in the step S1101, the subroutine turns on a flag indicating an abnormality of the output rotation speed sensor 65 in a step S1106 and the subroutine is terminated.

If it is determined that no signal is input from the input rotation speed sensor 64 in the step S1102, the subroutine turns on a flag indicating an abnormality of the input rotation speed sensor 64 in a step S1107 and the subroutine is terminated.

If it is determined that no signal is input from the engine rotation speed sensor 68 in the step S1103, the subroutine turns on a flag indicating an abnormality of the engine rotation speed sensor 68 in a step S1108 and the subroutine is terminated.

If no abnormality is found in any of the steps S1101–S1103, the subroutine proceeds to a step S1201 where output signals from the rotation sensors are examined.

Figure 18A:
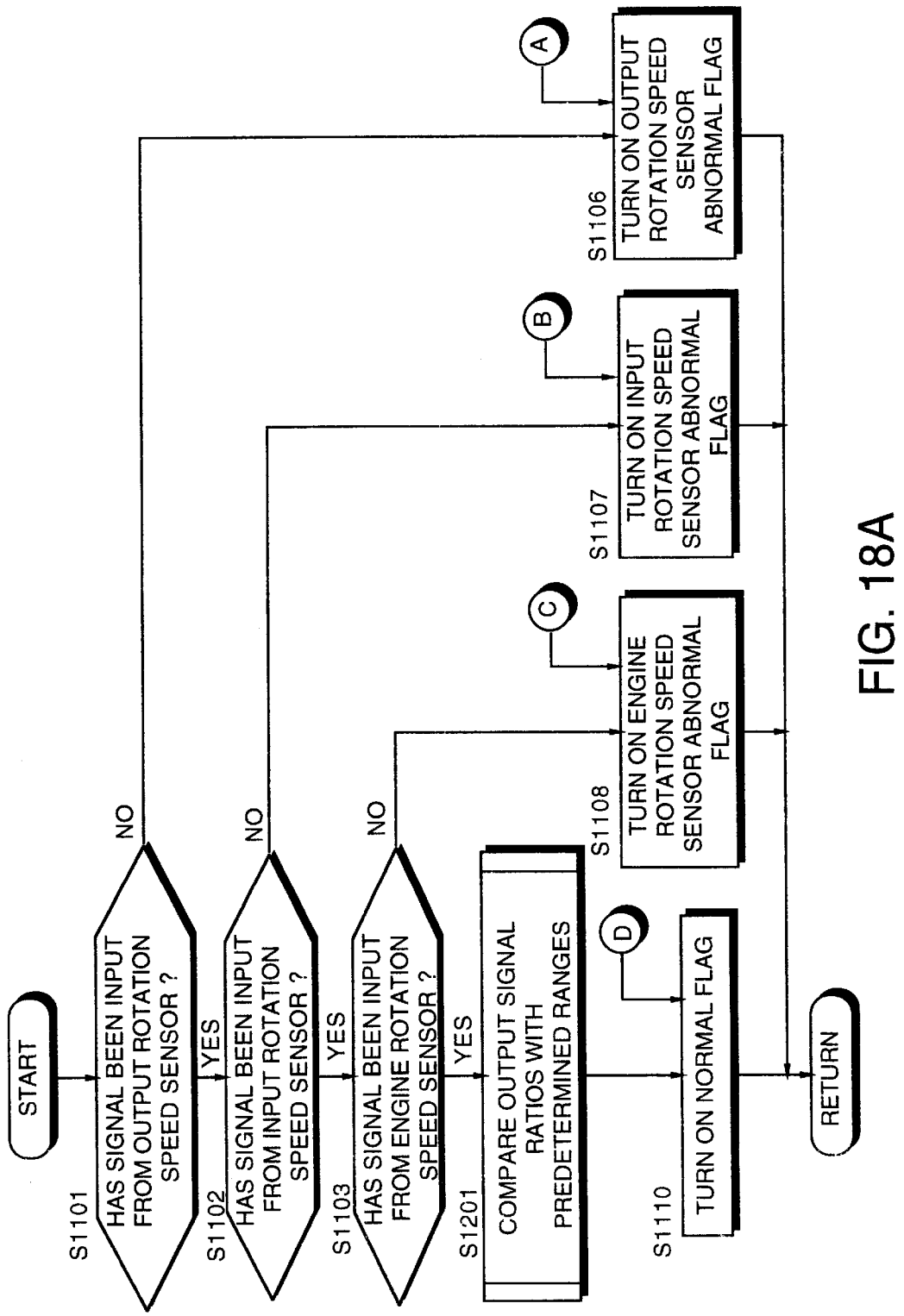
FIGS. 18A and 18B is a flowchart describing an abnormality determining subroutine of rotation speed sensors performed by the controller.
Figure 18B:
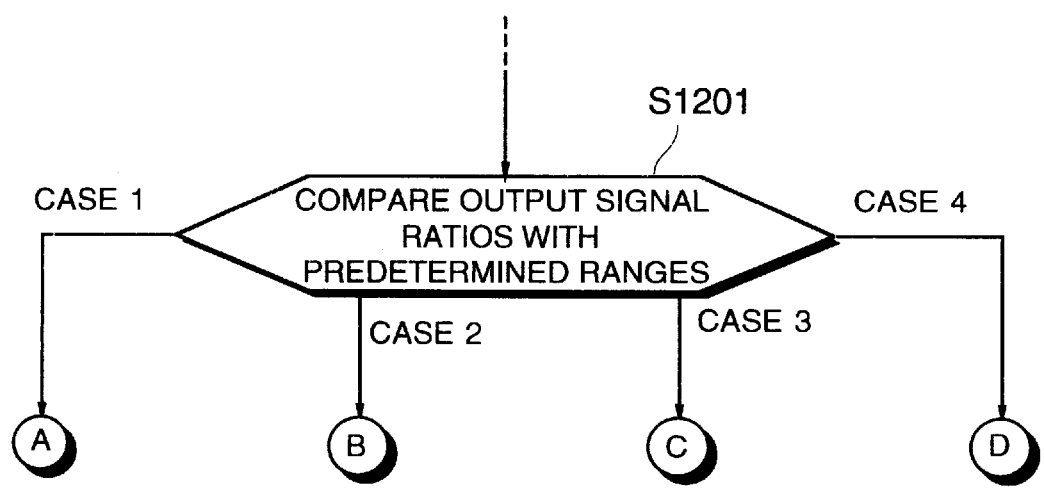

The processing of the step S1201 is shown in FIG. 18B.

Herein, it is determined if the ratio of the signals from the input rotation speed sensor 64 and output rotation speed sensor 65, i.e. Ni/No, the ratio of the signals from the output rotation speed sensor 65 and engine rotation speed sensor 68, i.e., No/Ne, and the ratio of the signals from the engine rotation speed sensor 68 and input rotation speed sensor 64, i.e., Ne/Ni, respectively lie within predetermined ranges defined for example according to the hardware operation limit of the transmission.

By finding which of the above ratios is falling out of the corresponding predetermined range, the subroutine can specify the sensor which has an three ratios fall out of the corresponding predetermined ranges.

The determination results are classified into the following four cases.

Case 1: Ni/No=out of range, No/Ne=out of range, and Ne/Ni=within range,
Case 2: Ni/No=out of range, No/Ne=within range, and Ne/Ni=out of range,
Case 3: Case 2: Ni/No=within range, No/Ne=out of range, and Ne/Ni=out of range, and
Case 4: other than Case 1–3.

When the determination result in the step S1201 corresponds to the Case 1, the subroutine proceeds to the step S1106 at FIG. 18A. When the determination result in the step S1201 corresponds to the Case 2, the subroutine proceeds to the step S1107 of FIG. 18A. When the determination result in the step S1201 corresponds to the Case 3, the subroutine proceeds to the step S1108 of FIG. 18A. If the determination result in the step S1201 does not correspond to any of the Case 1–3, the subroutine proceeds to the step S1110 of FIG. 18A and turn on a flag indicating that all the rotation speed sensors are working as they should.

By specifying the sensor which has an abnormality in this way, it is also possible to determine whether or not a specific sensor has an abnormality. In the step S241 of FIG. 6, among the three rotation speed sensors 64, 65, 68, abnormality of only the engine rotation sensor 68 is determined. Such a determination is enabled by use of this above subroutine.

When plural sensors have an abnormality at the same time in this subroutine, the determination result is the same as when no sensors have an abnormality. However, such a situation is quite rare, the handling of such a situation is omitted in this embodiment.

According to the speed ratio control device as described above, even when one of the rotation speed sensors has an abnormality, the effect of the abnormality on the speed ratio control is minimized.

The contents of Tokugan Hei 10-175694 with a filing date of Jun. 23, 1998 in Japan, Tokugan Hei 10-209451 with a filing date of Jul. 24, 1998 in Japan, Tokugan Hei 10-224663 with a filing date of Aug. 7, 1998 in Japan, and Tokugan Hei 10-224665 with a filing date of Aug. 7, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the abnormality determination is performed with respect to the engine rotation speed sensor 68, input rotation speed sensor 64 and output rotation speed sensor 65 in this embodiment. However, it is also possible to determine an abnormality of other rotation speed sensors. In a speed ratio control device that uses a vehicle speed sensor instead of the output rotation speed sensor to detect the vehicle running speed, the abnormality of the vehicle speed sensor may also be determined in a similar manner.

In this embodiment, the determined number of rotation speed sensors is three, but the same algorithm may be applied to determine an abnormality in more than four sensors and to specify which sensor has an abnormality, by increasing the number of Cases in the step S1201.

The embodiments of this invention in which an exclusive property or privilege is claimed are defined as follows:

What is claimed is:

1. A speed ratio control device for use with a continuously variable transmission for a vehicle, said transmission transmitting an output torque of an engine to a drive wheel at an arbitrary speed ratio, said device comprising:
   a sensor for detecting a rotation speed of said engine,
   a sensor for detecting an input rotation speed of said transmission,
   a sensor for detecting an output rotation speed of said transmission, and a microprocessor programmed to:
      control the speed ratio of said transmission within a predetermined speed ratio range based on output signals from said sensors,
      perform a determination if any of said sensors has an abnormality based on the output signals from said sensors, and
      correct said predetermined speed ratio range to be narrower when any of said sensors has been determined to have an abnormality,
   wherein said transmission comprises a toroidal continuously variable transmission, said control device further comprises a sensor for detecting an intake air flowrate of said engine, and said microprocessor is further programmed to calculate a fuel injection amount of said engine from said intake air flowrate and the engine rotation speed, calculate an input torque of said transmission from said fuel injection amount and said engine rotation speed, calculate a torque shift error correction value from said input torque of said transmission and a predetermined target speed ratio, apply said torque shift error correction value to control of the speed ratio of said transmission when none of said sensors has been determined to have an abnormality, and prevent said torque shift error correction value from being applied to control of the speed ratio of said transmission when any of said sensors has been determined to have abnormality.

2. A speed ratio control device as defined in claim 1, wherein said microprocessor is further programmed to prevent said torque shift error correction value from being applied to control of the speed ratio of said transmission by setting said torque shift error correction value equal to 0.

3. A speed ratio control device as defined in claim 1, wherein said microprocessor is further programmed to determine if said intake air flowrate sensor has an abnormality from an output signal from said intake air flowrate sensor, and prevent said torque shift error correction value from being applied to control of the speed ratio of said transmission when said intake air flowrate sensor has determined to have an abnormality.

4. A speed ratio control device for use with a continuously variable transmission for a vehicle, said transmission transmitting an output torque of an engine to a drive wheel at an arbitrary speed ratio, said device comprising:

sensing means for detecting a rotation speed of said engine, sensing means for detecting an input rotation speed of said transmission, sensing means for detecting an output rotation speed of said transmission, means for controlling the speed ratio of said transmission within a predetermined speed ratio range based on output signals from said sensing means', means for performing a determination if any of said sensing means has an abnormality based on the output signals from said sensing means', and means for correcting said predetermined speed ratio range to be narrower when any of said sensing means has been determined to have an abnormality, wherein said transmission comprises a toroidal continuously variable transmission, said control device further comprises a sensing means for detecting an intake air flowrate of said engine, and wherein said means for correcting is further programmed to calculate a fuel injection amount of said engine from said intake air flowrate and the engine rotation speed, calculate an input torque of said transmission from said fuel injection amount and said engine rotation speed, calculate a torque shift error correction value from said input torque of said transmission and a predetermined target speed ratio, apply said torque shift error correction value to control of the speed ratio of said transmission when none of said sensing means has been determined to have an abnormality, and prevent said torque shift error correction value from being applied to control of the speed ratio of said transmission when any of said sensing means has been determined to have abnormality.

5. A speed ratio control method of a continuously variable transmission for a vehicle, said transmission transmitting an output torque of an engine to a drive wheel at an arbitrary speed ratio, said method comprising:

detecting a rotation speed of said engine from an output signal from an engine rotation speed sensor, detecting an input rotation speed of said transmission from an output signal from an input rotation speed sensor, detecting an output rotation speed of said transmission from an output signal from an input rotation speed sensor, controlling the speed ratio of said transmission within a predetermined speed ratio range based on said output signals from said sensors, performing a determination if any of said sensors has an abnormality based on the output signals from said sensors, and correcting said predetermined speed ratio range to be narrower when any of said sensors has been determined to have an abnormality, wherein said speed ratio control method further comprises:

detecting an intake air flowrate of said engine from an output signal of an intake air flowrate sensor, calculating a fuel injection amount of said engine from said intake air flowrate and the engine rotation speed, calculating an input torque of said transmission from said fuel injection amount and said engine rotation speed, calculate a torque shift error correction value from said input torque of said transmission and a predetermined target speed ratio, and applying said torque shift error correction value to control of the speed ratio of said transmission when none of said sensors has been determined to have an abnormality, and preventing said torque shift error correction value from being applied to control of the speed ratio of said transmission when any of said sensors has been determined to have abnormality.

6. A control device for use with a continuously variable transmission (CVT) for a vehicle, said transmission transmitting an output torque of an engine to a drive wheel at an arbitrary speed ratio, said device comprising:

a sensor for detecting a value used in a feedback control of the CVT, wherein the feedback control amount is calculated based on a real speed ratio and a target speed ratio; and a microprocessor programmed to:

control the speed ratio of said transmission within a predetermined speed ratio range for a basic control of the CVT;

determine if the sensor has an abnormality based on an output signal from the sensor;

limit the speed ratio range to be narrower than said predetermined speed ratio range when the abnormality is determined; and prohibit the feedback control and continue the basic control within the narrower speed ratio range when the abnormality is determined.

7. The control device according to claim 6, wherein the sensor includes one of a CVT input speed sensor and a CVT output speed sensor.

8. The control device according to claim 6, wherein the sensor includes one of a line pressure sensor and a oil temperature sensor.

9. A control device for use with a continuously variable transmission (CVT) for a vehicle, said transmission transmitting an output torque of an engine to a drive wheel at an arbitrary speed ratio, said device comprising:

a sensor for detecting a value used in a torque shift control of the CVT, wherein the torque shift control includes calculating a correction value based on engine output torque, a torque ratio of a torque converter, and a target speed ratio of the CVT; and a microprocessor programmed to:

determine if the sensor has an abnormality based on an output signal from the sensor;

control the speed ratio of said transmission within a predetermined speed ratio range for a basic control of the CVT;

limit the speed ratio range to be narrower than said predetermined speed ratio range when the abnormality is determined; and prohibit the torque shift control and continue the basic control within the narrower speed ratio range when the abnormality is determined.

10. The control device according to claim 9, wherein the sensor includes one of an engine output torque sensor, an engine speed sensor, and a CVT input speed sensor.

11. The control device according to claim 9, wherein the engine output torque sensor includes an air flowrate sensor.

12. The control device according to claim 9, wherein the engine output torque sensor includes an throttle sensor.

* * * * *